(12) United States Patent
Zhu et al.

(10) Patent No.: US 11,943,647 B2
(45) Date of Patent: *Mar. 26, 2024

(54) USER EQUIPMENT MEASUREMENT FOR CROSS-LINK INTERFERENCE

(71) Applicant: QUALCOMM Incorporated, San Diego, CA (US)

(72) Inventors: Xipeng Zhu, San Diego, CA (US); Peter Gaal, San Diego, CA (US); Umesh Phuyal, San Diego, CA (US); Huilin Xu, San Diego, CA (US); Masato Michael Kitazoe, Tokyo (JP); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/152,655

(22) Filed: Jan. 19, 2021

(65) Prior Publication Data

US 2021/0144577 A1 May 13, 2021

Related U.S. Application Data

(63) Continuation of application No. 16/802,433, filed on Feb. 26, 2020, now Pat. No. 10,924,959.

(Continued)

(51) Int. Cl.
*H04L 12/28* (2006.01)
*H04B 17/318* (2015.01)
(Continued)

(52) U.S. Cl.
CPC .......... *H04W 24/10* (2013.01); *H04B 17/318* (2015.01); *H04B 17/336* (2015.01); *H04W 76/28* (2018.02)

(58) Field of Classification Search
CPC .. H04B 17/336; H04B 17/345; H04B 17/318; H04J 11/005; H04J 11/0023;
(Continued)

(56) References Cited

U.S. PATENT DOCUMENTS 10,727,995 B2 7/2020 Nam et al.
2016/0295439 A1 10/2016 Yang et al.
(Continued)

FOREIGN PATENT DOCUMENTS

EP 3567759 A1 11/2019
TW 201906372 A 2/2019
(Continued)

OTHER PUBLICATIONS

European Search Report—EP22159602—Search Authority—Munich—dated May 31, 2022 (192577EPD1).
(Continued)

*Primary Examiner* — John Pezzlo
(74) *Attorney, Agent, or Firm* — Holland & Hart LLP

(57) ABSTRACT

Methods, systems, and devices for wireless communications are described. A user equipment (UE) may receive from a base station a measurement configuration signal comprising a measurement resource configuration associated with a cross-link interference signal strength measurement. The UE may perform the cross-link interference signal strength measurement for one or more UEs associated with one or more intra-frequency neighboring cells according to the measurement resource configuration, wherein the cross-link interference signal strength measurement is performed during an intra-frequency measurement gap. The UE may transmit a report of the cross-link interference signal strength measurement to the base station.

24 Claims, 17 Drawing Sheets

Related U.S. Application Data

(60) Provisional application No. 62/842,426, filed on May 2, 2019.

(51) Int. Cl.
  *H04B 17/336* (2015.01)
  *H04W 24/10* (2009.01)
  *H04W 76/28* (2018.01)
  *H04J 1/16* (2006.01)

(58) Field of Classification Search
  CPC ......... H04L 25/0226; H04L 27/26025; H04W 24/10; H04W 72/082; H04W 76/28; H04W 52/243; H04W 72/541; H04W 72/0446
  USPC .......................... 370/252, 329, 386, 430, 442
  See application file for complete search history.

(56) References Cited

U.S. PATENT DOCUMENTS

| | | |
|---|---|---|
| 2017/0118690 A1 | 4/2017 | Patel et al. |
| 2018/0323916 A1 | 11/2018 | Yang et al. |
| 2019/0053085 A1 | 2/2019 | Pao et al. |
| 2019/0274155 A1 | 9/2019 | Bhattad et al. |
| 2020/0112420 A1 | 4/2020 | Xu et al. |
| 2020/0351065 A1* | 11/2020 | Esswie ................ H04B 17/336 |
| 2020/0351690 A1 | 11/2020 | Zhu |
| 2020/0389805 A1* | 12/2020 | Kim ..................... H04W 72/23 |
| 2022/0006501 A1* | 1/2022 | Kim ..................... H04B 7/0632 |
| 2022/0022073 A1* | 1/2022 | Zhang ................. H04W 72/542 |
| 2022/0030456 A1* | 1/2022 | Sundberg ............. H04L 5/1469 |
| 2022/0060265 A1* | 2/2022 | Xu ........................ H04W 24/08 |
| 2022/0110136 A1* | 4/2022 | Li ........................ H04W 72/542 |
| 2022/0159596 A1* | 5/2022 | Kim ..................... H04B 17/336 |
| 2022/0201524 A1* | 6/2022 | Ying ................. H04W 74/0866 |

FOREIGN PATENT DOCUMENTS

| | | |
|---|---|---|
| WO | WO2018128297 A1 | 7/2018 |
| WO | WO2018228583 A1 | 12/2018 |

OTHER PUBLICATIONS

Huawei, et al: "UE-to-UE Measurement for Cross-link Interference Mitigation," 3GPP Draft, 3GPP TSG RAN WG1 Meeting #92, R1-1801798, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Feb. 17, 2018 (Feb. 17, 2018), XP051397772, 13 pages, Retrieved from the Internet: http://www.3gpp.org/ftp/tsg%5Fran/WG1%5FRL1/TSGR1%5F92/Docs/ [retrieved on Feb. 17, 2018] section 2.1, the whole document.

International Search Report and Written Opinion—PCT/US2020/020192—ISAEPO—dated May 12, 2020.

LG Electronics: "Discussion on CLI Measurement for Duplexing Flexibility", 3GPP Draft, 3GPP TSG RAN WG1 NR Ad-Hoc#2, R1-1710350 Discussion on CLI Measurement for Duplexing Flexibility, 3rd Generation Partnership Project (3GPP), Mobile Competence Centre, 650, Route Des Lucioles, F-06921 Sophia-Antipolis, vol. RAN WG1, No. Qingdao, P. R. China, Jun. 27, 2017-Jun. 30, 2017, Jun. 26, 2017 (Jun. 26, 2017), XP051299564, 7 Pages, Retrieved from the Internet: URL: http://www.3gpp.org/ftp/Meetings_3GPP_SYNC/RAN1/Docs/, [retrieved on Jun. 26, 2017], p. 6.

Samsung: "Cross-link Interference Measurements and Reporting at a UE", 3GPP Draft, 3GPP TSG RAN WG1 #96, R1-1902292 CLI at UE_V3, 3rd Generation Partnership Project (3GPP), Mobile Competence Centre, 650, Route Des Lucioles, F- 06921 Sophia-Antipolis Cedex, France, vol. RAN WG1, No. Athens, Greece, Feb. 25, 2019-Mar. 1, 2019, Feb. 15, 2019 (Feb. 15, 2019), XP051599986, 3 Pages, Retrieved from the Internet: URL: http://www.3gpp.org/ftp/tsg%5Fran/WG1%5FRL1/TSGR1%5F96/Docs/R1%2D1902292%2Ezip, [retrieved on Feb. 15, 2019], pp. 1-3.

* cited by examiner

USER EQUIPMENT MEASUREMENT FOR CROSS-LINK INTERFERENCE

CROSS REFERENCE

The present application for patent is a Continuation of U.S. patent application Ser. No. 16/802,433 by ZHU et al., entitled "USER EQUIPMENT MEASUREMENT FOR CROSS-LINK INTERFERENCE" filed Feb. 26, 2020, which claims the benefit of U.S. Provisional Patent Application No. 62/842,426 by ZHU et al., entitled "USER EQUIPMENT MEASUREMENT FOR CROSS-LINK INTERFERENCE," filed May 2, 2019, assigned to the assignee hereof, and expressly incorporated herein.

BACKGROUND

The following relates generally to wireless communications, and more specifically to user equipment (UE) measurement for cross-link interference (CLI).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

Wireless communication systems may be deployed in a heterogenous manner such that asynchronous cell deployment may become an issue with respect to interference. For example, wireless networks may have significant variations in traffic load between different cells (or base stations) and at different times. This may result in asymmetric and dynamic changes to uplink and downlink traffic between different cells (or base stations). While some wireless networks may rely on time division duplexing (TDD) to mitigate such asymmetry, this approach may require that the cells (or base stations) synchronize their uplink and downlink transmissions. However, synchronization between cells may not always be possible, which may introduce CLI, e.g., opposite transmission directions at different cells leading to uplink-to-downlink interference and/or downlink-to-uplink interference. Such interference may be even more pronounced in dense deployment scenarios, such as small cell deployments, millimeter wave (mmW) deployments, and the like, where multiple asynchronous cells are deployed in a relatively small footprint and with overlapping coverage areas.

SUMMARY

The described techniques relate to improved methods, systems, devices, and apparatuses that support user equipment (UE) measurement for cross-link interference (CLI). Generally, the described techniques provide for UE measurement of CLI based, at least in some aspects, on coordination of a measurement resource configuration between base stations. For example, the base stations may be deployed such that there may have partially overlapping coverage areas. The base stations may coordinate with each other to establish or otherwise configure a measurement resource configuration associated with a CLI signal strength measurement for their respective UEs. For example, the base station may share and/or combine measurement resources used for CLI signal strength measurements by their respective UEs. Each base station may transmit or otherwise provide a measurement configuration signal to its respective UE, which may then perform the CLI signal strength measurements for neighboring UEs (e.g., for UE(s) in intra-frequency neighboring cell(s)) according to the measurement resource configuration. In some examples, the UEs may perform the CLI signal strength measurements during an intra-frequency measurement gap, e.g., for one UE to measure the signal strength of an uplink signal of UE(s) in intra-frequency neighboring cell(s). Accordingly, one or more of the UEs may transmit or otherwise provide a report of the CLI signal strength measurement to the respective base station, which may use this information when scheduling wireless communications with the respective UEs in a manner that mitigates or avoids CLI.

A method of wireless communication at a first UE is described. The method may include receiving from a base station a measurement configuration signal including a measurement resource configuration associated with a CLI signal strength measurement, performing the CLI signal strength measurement for one or more UEs associated with one or more intra-frequency neighboring cells according to the measurement resource configuration, and transmitting a report of the CLI signal strength measurement to the base station.

An apparatus for wireless communication at a first UE is described. The apparatus may include a processor, memory coupled with the processor, and instructions stored in the memory. The instructions may be executable by the processor to cause the apparatus to receive from a base station a measurement configuration signal including a measurement resource configuration associated with a CLI signal strength measurement, perform the CLI signal strength measurement for one or more UEs associated with one or more intra-frequency neighboring cells according to the measurement resource configuration, and transmit a report of the CLI signal strength measurement to the base station.

Another apparatus for wireless communication at a first UE is described. The apparatus may include means for receiving from a base station a measurement configuration signal including a measurement resource configuration associated with a CLI signal strength measurement, means for performing the CLI signal strength measurement for one or more UEs associated with one or more intra-frequency neighboring cells according to the measurement resource configuration, and means for transmitting a report of the CLI signal strength measurement to the base station.

A non-transitory computer-readable medium storing code for wireless communication at a first UE is described. The code may include instructions executable by a processor to receive from a base station a measurement configuration signal including a measurement resource configuration associated with a CLI signal strength measurement, perform the CLI signal strength measurement for one or more UEs associated with one or more intra-frequency neighboring cells according to the measurement resource configuration, and transmit a report of the CLI signal strength measurement to the base station.

In some examples of the method, apparatuses, and non-transitory computer-readable medium described herein, the measurement resource configuration includes one or more of a reporting configuration for the CLI signal strength measurement, a filtering configuration for the CLI signal strength measurement, a measurement gap configuration for the CLI signal strength measurement, or a quantity configuration for the CLI signal strength measurement. In some examples of the method, apparatuses, and non-transitory computer-readable medium described herein, the CLI signal strength measurement is performed during an intra-frequency measurement gap based at least in part on the measurement gap configuration.

Some examples of the method, apparatuses, and non-transitory computer-readable medium described herein may further include operations, features, means, or instructions for determining to perform the CLI signal strength measurement during a discontinuous reception (DRX) mode off period based on a measurement accuracy threshold.

Some examples of the method, apparatuses, and non-transitory computer-readable medium described herein may further include operations, features, means, or instructions for determining, based on a slot duration and a subcarrier spacing associated with a link between the UE and the base station, a periodicity for the CLI signal strength measurement, where transmitting the report may be based on the determined periodicity.

Some examples of the method, apparatuses, and non-transitory computer-readable medium described herein may further include operations, features, means, or instructions for detecting that a triggering condition for an event is fulfilled based at least in part on a comparison of the CLI signal strength measurement to a threshold, and transmitting the report is based at least in part on the event.

In some examples of the method, apparatuses, and non-transitory computer-readable medium described herein, the triggering condition includes one or more of a first triggering condition associated with the CLI signal strength measurement falling below a low threshold or a second triggering condition associated with the CLI signal strength measurement exceeding a high threshold.

Some examples of the method, apparatuses, and non-transitory computer-readable medium described herein may further include operations, features, means, or instructions for receiving from the base station an indication of a type of CLI signal strength measurement, where performing the CLI signal strength measurement and reporting the CLI signal strength measurement may be based on the indicated type of CLI signal strength measurement. In some examples of the method, apparatus, and non-transitory computer-readable medium described above, the indication of the type of cross-link signal is received as one or more of: an explicit signal of the type of cross-link signal or an implicit indication of the type of cross-link signal.

In some examples of the method, apparatuses, and non-transitory computer-readable medium described herein, the indicated type of CLI signal strength measurement includes one or more of a CLI reference signal strength indicator (RSSI) measurement type or a sounding reference signal-reference signal received power (SRS-RSRP) measurement type.

In some examples of the method, apparatuses, and non-transitory computer-readable medium described herein, the measurement configuration signal includes a first measurement configuration associated with the CLI RSSI measurement type and a second measurement configuration associated with the sounding reference signal RSRP measurement type.

In some examples of the method, apparatuses, and non-transitory computer-readable medium described herein, the report of the CLI signal strength measurement includes an indication that a cross-link signal for the UE(s) (e.g., UEs in intra-frequency neighboring cells) is be too strong to measure or a CLI signal strength measurement value associated with the cross-link signal being too strong to measure.

In some examples of the method, apparatuses, and non-transitory computer-readable medium described herein, the report of the CLI signal strength measurement may be transmitted together with a serving cell measurement report.

In some examples of the method, apparatuses, and non-transitory computer-readable medium described herein, the CLI signal strength measurement includes a SRS based RSRP measurement type that may be dependent on a bandwidth part.

In some examples of the method, apparatuses, and non-transitory computer-readable medium described herein, the CLI signal strength measurement may be performed using a single antenna port of the UE.

A method of wireless communication at a base station is described. The method may include coordinating with a neighboring base station to configure a measurement resource configuration associated with a CLI signal strength measurement for a UE associated with the base station, transmitting to the UE a measurement configuration signal including the measurement resource configuration, and receiving a report of the CLI signal strength measurement from the UE, the CLI signal strength measurement being based on the measurement resource configuration.

An apparatus for wireless communication at a base station is described. The apparatus may include a processor, memory coupled with the processor, and instructions stored in the memory. The instructions may be executable by the processor to cause the apparatus to coordinate with a neighboring base station to configure a measurement resource configuration associated with a CLI signal strength measurement for a UE associated with the base station, transmit to the UE a measurement configuration signal including the measurement resource configuration, and receive a report of the CLI signal strength measurement from the UE, the CLI signal strength measurement being based on the measurement resource configuration.

Another apparatus for wireless communication at a base station is described. The apparatus may include means for coordinating with a neighboring base station to configure a measurement resource configuration associated with a CLI signal strength measurement for a UE associated with the base station, means for transmitting to the UE a measurement configuration signal including the measurement resource configuration, and means for receiving a report of the CLI signal strength measurement from the UE, the CLI signal strength measurement being based on the measurement resource configuration.

A non-transitory computer-readable medium storing code for wireless communication at a base station is described. The code may include instructions executable by a processor to coordinate with a neighboring base station to configure a measurement resource configuration associated with a CLI signal strength measurement for a UE associated with the base station, transmit to the UE a measurement configuration signal including the measurement resource configuration, and receive a report of the CLI signal strength measurement from the UE, the CLI signal strength measurement being based on the measurement resource configuration.

In some examples of the method, apparatuses, and non-transitory computer-readable medium described herein, the measurement resource configuration includes one or more of a reporting configuration for the CLI signal strength measurement, a filtering configuration for the CLI signal strength measurement, a measurement gap configuration for the CLI signal strength measurement, or a quantity configuration for the CLI signal strength measurement.

Some examples of the method, apparatuses, and non-transitory computer-readable medium described herein may further include operations, features, means, or instructions for coordinating with the neighboring base station may be over at least one of an Xn interface, or an F1 interface, or a combination thereof, and where the coordinating includes an exchange of one or more of an interface setup message, a configuration update message, or a combination thereof.

Some examples of the method, apparatuses, and non-transitory computer-readable medium described herein may further include operations, features, means, or instructions for determining a filtering configuration for the CLI signal strength measurement based on the measurement resource configuration, where the CLI signal strength measurement may be based on the determined filtering configuration.

Some examples of the method, apparatuses, and non-transitory computer-readable medium described herein may further include operations, features, means, or instructions for determining, based on a slot duration and a subcarrier spacing associated with a link between the UE and the base station, a periodicity for the CLI signal strength measurement, where receiving the report may be based on the determined periodicity.

Some examples of the method, apparatuses, and non-transitory computer-readable medium described herein may further include operations, features, means, or instructions for receiving the report may be based on a fulfillment of a triggering condition for an event based on a comparison of the CLI signal strength measurement to a threshold.

In some examples of the method, apparatuses, and non-transitory computer-readable medium described herein, the triggering condition may include a first triggering event associated with the CLI signal strength measurement falling below a low threshold or a second triggering condition associated with the CLI signal strength measurement exceeding a high threshold.

Some examples of the method, apparatuses, and non-transitory computer-readable medium described herein may further include operations, features, means, or instructions for transmitting to the UE an indication of a type of CLI signal strength measurement, where the CLI signal strength measurement and report of the CLI signal strength measurement may be based on the indicated type of CLI signal strength measurement.

In some examples of the method, apparatuses, and non-transitory computer-readable medium described herein, the indicated type of CLI signal strength measurement may include operations, features, means, or instructions for a CLI-RSSI measurement type or a SRS-RSRP measurement type.

In some examples of the method, apparatuses, and non-transitory computer-readable medium described herein, the measurement configuration signal includes a first measurement configuration associated with the CLI RSSI measurement type and a second measurement configuration associated with the sounding reference signal RSRP measurement type.

In some examples of the method, apparatuses, and non-transitory computer-readable medium described herein, the report of the CLI signal strength measurement includes an indication that a cross-link signal for UEs in intra-frequency neighboring cells may be too strong to measure or a CLI signal strength measurement value associated with the cross-link signal being too strong to measure.

In some examples of the method, apparatuses, and non-transitory computer-readable medium described herein, the report of the CLI signal strength measurement may be received together with a serving cell measurement report.

In some examples of the method, apparatuses, and non-transitory computer-readable medium described herein, the CLI signal strength measurement includes a SRS-RSRP measurement type that may be dependent on a bandwidth part.

DETAILED DESCRIPTION

Cross-link interference (CLI) may include opposite transmission directions at different cells leading to uplink-to-downlink interference and/or downlink-to-uplink interference. Such CLI may be even more pronounced in dense deployment scenarios, e.g., such as where many cells are deployed in a small geographic footprint. Conventional techniques may define or otherwise provide for a measurement of the CLI, but do not provide any mechanism to perform and/or report such CLI measurements. That is, conventional techniques may define a CLI received signal strength indicator (RSSI) measurement (CLI-RSSI) and/or a sounding reference signal (SRS) reference signal received power (RSRP) measurement (SRS-RSRP) for CLI, but may not provide any mechanism by which such measurements are configured, performed, and/or reported by base station(s) and/or user equipment (UE)(s).

Accordingly, aspects of the described techniques provide various mechanisms that can be employed to configure, perform, and report CLI measurement information by UEs. For example, neighboring base stations may coordinate over an Xn/F1 interface to establish otherwise configure a measurement resource configuration for a CLI signal strength measurement (e.g., CLI-RSSI and/or SRS-RSRP measurements). Each base station may transmit or otherwise provide a measurement configuration signal to their respective UE(s) that carries or otherwise conveys an indication of the measurement resource configuration for the CLI signal strength measurement. One or more of the UEs within the coverage area of a base station may perform the CLI signal strength measurement for one or more UEs associated with one or more intra-frequency neighboring cells (e.g., may measure a transmission from the neighboring UE) according to the measurement resource configuration. In some examples, the CLI signal strength measurement may be performed during an intra-frequency measurement gap, e.g., a layer 3 measurement gap. Each UE may then transmit or otherwise provide a report of the CLI signal strength measurement to each respective base station. The base stations may use the report of the CLI signal strength measurement to mitigate or avoid CLI within their respective coverage areas.

Aspects of the disclosure are initially described in the context of a wireless communication system. Aspects of the disclosure are further illustrated by and described with reference to apparatus diagrams, system diagrams, and flowcharts that relate to UE measurement for CLI.

Figure 1:
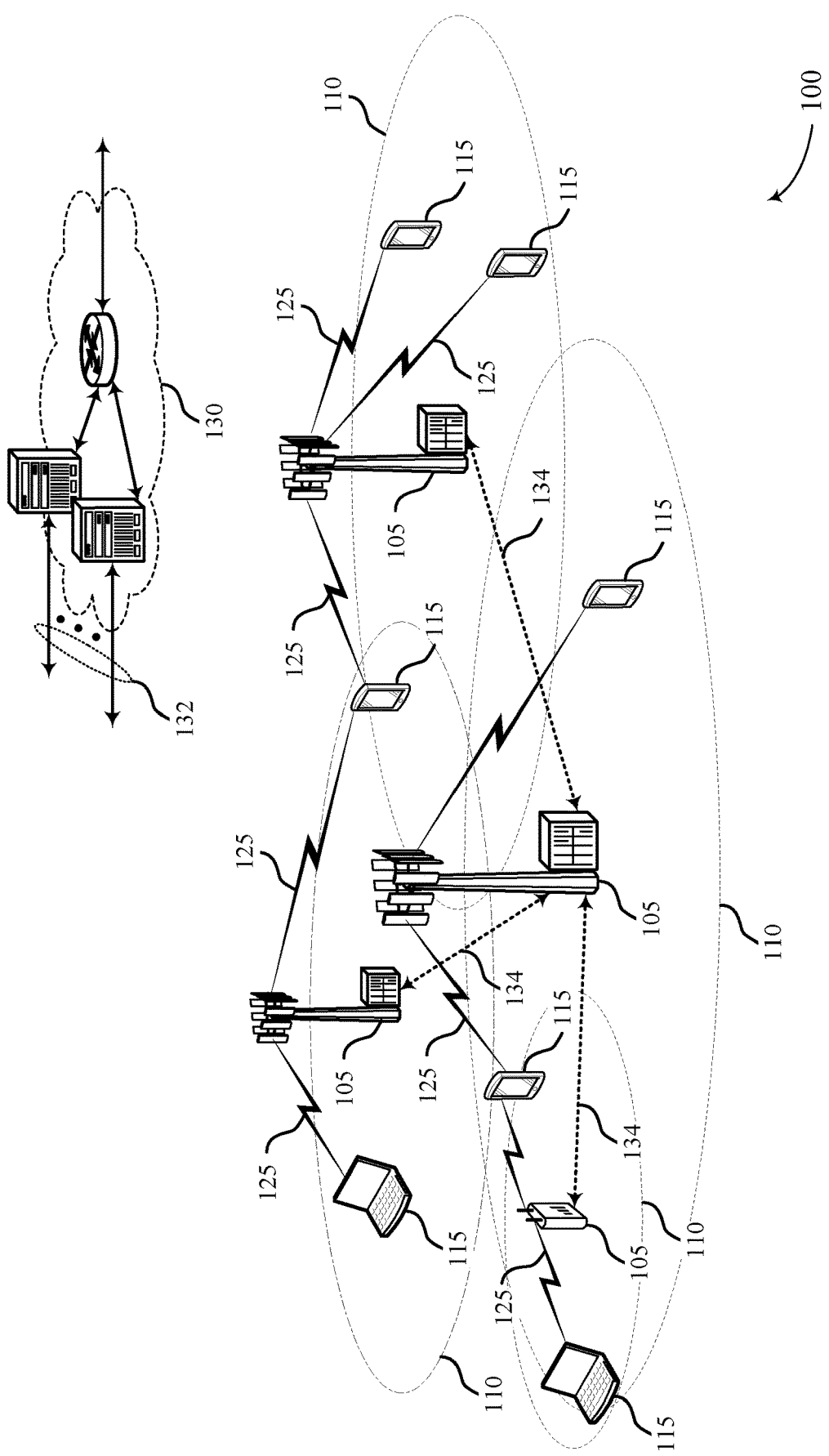
FIG. 1 illustrates an example of a system for wireless communications that supports user equipment (UE) measurement for cross-link interference (CLI) in accordance with aspects of the present disclosure.

FIG. 1 illustrates an example of a wireless communication system 100 that supports UE measurement for CLI in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing (SCS) or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive from a base station 105 a measurement configuration signal comprising a measurement resource configuration associated with a CLI signal strength measurement. The UE 115 may perform the CLI signal strength measurement for one or more UEs 115 associated with one or more intra-frequency neighboring cells according to the measurement resource configuration, wherein the CLI signal strength measurement is performed during an intra-frequency measurement gap. The UE 115 may transmit a report of the CLI signal strength measurement to the base station 105.

In some aspects, a base station 105 may coordinating with a neighboring base station 105 to configure a measurement resource configuration associated with a CLI signal strength measurement for a UE 115 associated with the base station. The base station 105 may transmit to the UE 115 a measurement configuration signal comprising the measurement resource configuration. The base station 105 may receive a report of the CLI signal strength measurement from the UE 115, the CLI signal strength measurement being performed during an intra-frequency measurement gap and based at least in part on the measurement resource configuration.

Figure 2:
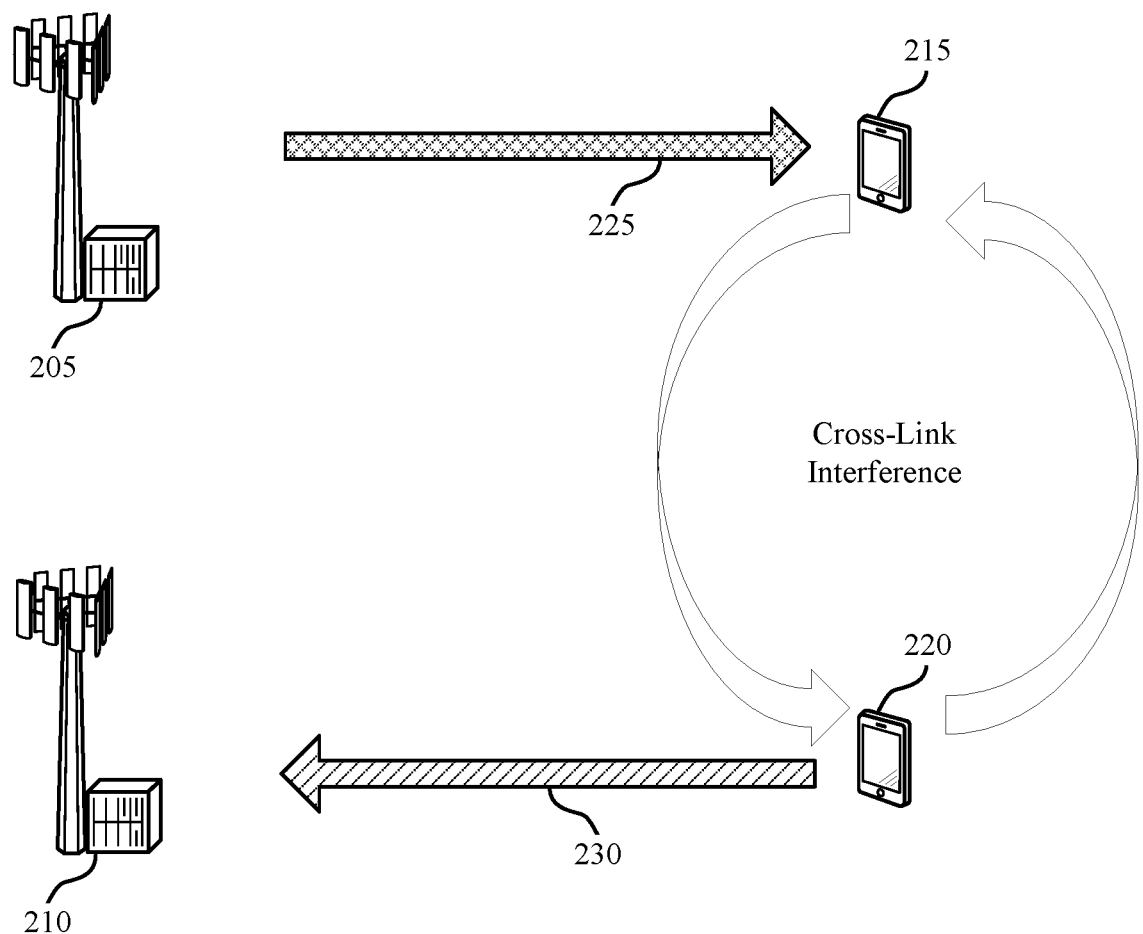
FIG. 2 illustrates an example of a system for wireless communications that supports UE measurement for CLI in accordance with aspects of the present disclosure.

FIG. 2 illustrates an example of a wireless communication system 200 that supports UE measurement for CLI in accordance with aspects of the present disclosure. In some examples, wireless communication system 200 may implement aspects of wireless communication system 100. Wireless communication system 200 may include base station 205, base station 210, UE 215, and UE 220, which may be examples of the corresponding devices described herein.

Generally, base station 205 may be a serving base station of UE 215 and base station 210 may be a serving base station of UE 220. In some aspects, base station 205 may be a neighboring base station with respect to base station 210, and vice versa. In some aspects, UE 215 may be a neighboring UE with respect to UE 220, and vice versa, (e.g., may each belong to different, but intra-frequency neighboring cells). In some aspects, wireless communication system 200 may experience CLI, e.g., opposite direction transmissions from different cells. For example, a downlink transmission 225 from base station 205 to UE 215 and/or an uplink transmission 230 from UE 220 to base station 210 may introduce or otherwise contributes to CLI. That is, the link between base station 205 and UE 215 may experience interference caused by transmissions between base station 210 and UE 220, and vice versa, which may be CLI.

Aspects of the described techniques provide a mechanism where UE 215 and/or UE 220 may perform CLI signal strength measurements for each other, and report the results of the CLI signal strength measurements to their respective base stations. In some aspects, the CLI signal strength measurements may be based, at least in some aspects, on a measurement resource configuration coordinated between base stations 205 and 210. That is, base stations 205 and 210 may coordinate over a link (e.g., a wired link and/or a wireless link) to establish or otherwise configure the measurement resource configuration to be used for CLI signal strength measurements. In some aspects, the CLI signal strength measurement may include CLI-RSSI and/or SRS-RSRP measurements.

In some aspects, the measurement resource configuration may include various resources (e.g., time, frequency, spatial, and the like), parameters, and the like. In some aspects, an information element of measurement resource configuration for CLI-RSSI measurement may carry or otherwise convey an indication of parameters such as, but not limited to, a number of physical resource blocks (PRBs), a starting PRB for subband indication, a number of OFDM symbol(s), a starting or first OFDM symbol index in the slot, and the like. In some aspects, the PRBs may be contiguous. In some aspects, the configured OFDM symbols may be contagious. In some aspects and depending on the capability of a particular UE, the UE may not be required to assume that physical downlink shared channel (PDSCH) is FDMd with CLI-RSSI measurement resources.

In some aspects, an information element of measurement resource configuration for CLI-RSSI measurement may carry or otherwise convey values for slot configurations being used for the CLI signal strength measurements. For example, the information element may carry or convey an indication of 10 slots using integer values (0 . . . 9), 20 slots using integer values (0 . . . 19), 40 slots using integer values (0 . . . 39), 80 slots using integer values (0 . . . 79), 160 slots using integer values (0 . . . 159), 320 slots using integer values (0 . . . 319), 640 slots using integer values (0 . . . 639), and so on. In some aspects, the network may allocate or otherwise configures slot durations for CLI-RSSI measurements which correspond with a value of periodicity among a periodicity set (e.g., 10 ms, 20 ms, 40 ms, 80 ms, 160 ms, 320 ms, 640 ms, etc.). An example of a CLI-RSSI configured measurement periodicity is illustrated in Table 1 below.

TABLE 1

| Slot Duration | SCS: 15 KHz | SCS: 30 KHz | SCS: 60 KHz | SCS: 120 KHz |
|---|---|---|---|---|
| 10 slots | 10 ms | | | |
| 20 slots | 20 ms | 10 ms | | |
| 40 slots | 40 ms | 20 ms | 10 ms | |
| 80 slots | 80 ms | 40 ms | 20 ms | 10 ms |
| 160 slots | 160 ms | 80 ms | 40 ms | 20 ms |
| 320 slots | 320 ms | 160 ms | 80 ms | 40 ms |
| 640 slots | 640 ms | 320 ms | 160 ms | 80 ms |

In some aspects, the information element of the measurement resource configuration for CLI-RSSI measurement may carry or convey a reference SCS for CLI-RSSI measurement. In some aspects, all SCS for frequency range 1 (FR1) and FR2 may be supported. In some aspects, SCS may include a reference unit of time and/or frequency resource configuration. In some aspects, the UE may perform CLI measurement (e.g., a CLI signal strength measurement) within an active bandwidth part (BWP). In some aspects, the SCS for CLI measurement resource configuration may be the same or different from the SCS of the active BWP. In some aspects, one or multiple resources for CLI-RSSI measurement may be configured. In some aspects, the number of measurement resources for CLI-RSSI measurement may be up to 64. Accordingly, in some aspects the periodicity of the CLI signal strength measurement may be determined based on the slot duration and/or SCS associated with the link between the UE and its respective serving base station.

In some aspects, the measurement resource configuration may include various information for SRS-RSRP measurement. In some aspects and in order to perform SRS transmissions for CLI measurement, this may include the timing advance (TA) value applied to the corresponding uplink symbol being the same as the latest TA for regular uplink symbols transmitted to the base station. In some aspects, for SRS-RSRP measurement the UE may not be required to perform time tracking or time adjustment other than a constant offset relative to its own downlink timing. The constant offset may be derived by UE implementation. For SRS transmissions for the purposes of SRS-RSRP measurement, conventional SRS resource set usage may be used. For example, for SRS-RSRP measurement, one or more SRS resource-per-serving cell may be configured. In some aspects, for SRS-RSRP measurement, the total number of SRS resources to be monitored by UE may not exceed 32.

Accordingly, base stations 205 and 210 may coordinate over a backhaul link (e.g., an Xn link or interface and/or an F1 link or interface) to configure the measurement resource configuration for the CLI signal strength measurement (e.g., CLI measurement using CLI-RSSI and/or SRS-RSRP) for an associated UE. In some aspects, one or both of base stations 205 and 210 may transmit or otherwise provide the measurement configuration signal to UEs 215 and 220, respectively, carrying or conveying an indication of the measurement resource configuration. In some aspects, this may include defining a measurement object for the CLI signal strength measurement (e.g., for the CLI measurement). Conventionally, an NR measurement object (MeasObjectNR) is defined for synchronization signal block (SSB) or a channel state information reference signal (CSI-RS) based measurements. However, these are different from CLI-RSSI and SRS-RSRP measurements. Moreover, the conventional measurement objects are defined for the UE to measure downlink signals, which is different from the UE measuring uplink signals for CLI measurements in accordance with aspects of the described techniques. Accordingly, aspects of the described techniques define a new measurement object for CLI measurements (e.g., for the CLI signal strength measurements).

In some aspects, this may include defining a new measurement object (MeasObjectCLI) for CLI-RSSI and SRS-RSRP measurements (e.g., the CLI signal strength measurement). In some aspects, the CLI measurement object (e.g., MeasObjectCLI) may include, carry, or otherwise convey, CLI-RSSI and SRS-RSRP measurement resource configuration (e.g., may carry or convey the measurement resource configuration transmitted to each respective UE). In some aspects, the CLI measurement object may include, carry, or otherwise convey, corresponding filtering configuration (e.g., a layer 3 filtering configuration) for CLI-RSSI and SRS-RSRP measurements. One example of the CLI measurement object may include, but is not limited to:

```
MeasObjectCLI ::=        SEQUENCE {
    cli-RSSI-Measurement CLI-RSSI-Measurement
        OPTIONAL,
    srs-RSRP-Measurement SRS-RSRP-Measurement
        OPTIONAL,
    ...
}
```

With respect to a CLI-RSSI measurement, the information element (CLI-RSSI-Measurement) may be used to configure CLI-RSSI measurements. In some aspects, the information element may be carried or conveyed in the measurement configuration signal carrying or indicating the measurement resource configuration. One example of the CLI-RSSI measurement information element may include, but is not limited to:

```
-- ASN1START
-- TAG-CLI-RSSI-MEASUREMENT-START
CLI-RSSI-Measurement ::=        SEQUENCE {
    <<fields TBD based on RAN1 LS>>,
    filterCoefficientCLI-RSSI        FilterCoefficient,
    ...
}
-- TAG-CLI-RSSI-MEASUREMENT-STOP
-- ASN1STOP
```

With respect to SRS-RSRP measurement, the information element (SRS-RSRP-Measurement) may be used to configure SRS-RSRP measurements. In some aspects, the information element may be carried or conveyed in the measurement configuration signal carrying or indicating a measurement resource configuration. One example of the SRS-RSRP measurement information element may include, but is not limited to:

```
-- ASN1START
-- TAG-SRS-RSRP-MEASUREMENT-START
SRS-RSRP-Measurement ::=        SEQUENCE {
    <<fields TBD based on RAN1 LS>>,
    filterCoefficientSRS-RSRP        FilterCoefficient,
    ...
}
```

-continued

```
-- TAG-SRS-RSRP-MEASUREMENT-STOP
-- ASN1STOP
```

In some aspects, all UEs served by particular cell (or base station) may be configured to transmit the same SRS at the same time in order to improve the efficiency and accuracy of the CLI signal strength measurement. Accordingly, neighboring cells (or base stations) may know the SRS measurement window.

In some aspects, it may be preferable that the measurement resource configuration is synchronized between intra-frequency neighbor cells (or base stations). For example, a central unit (CU) and/or base station may get its member cells synchronized in the CLI measurement resource, e.g., may coordinate the measurement resource configuration. In some aspects, an operations and management (OAM) function may be responsible for synchronizing the measurement resource configurations of its managed base stations/CUs.

In some aspects, if the neighbor cells (or base stations) are not synchronized for the SRS configuration, a base station may configure CLI-RSSI/SRS-RSRP measurement for serving UEs by putting the neighbor cell's (or base station's) CLI-RSSI/SRS-RSRP measurement resources as a list into the SRS-RSRP measurement resource configuration. Accordingly, in some aspects the measurement resource configuration (e.g., the CLI-RSSI and/or SRS-RSRP measurement resources) may be coordinated between intra-frequency neighboring cells (or base stations).

Accordingly, a base station may coordinate with the neighboring base station (e.g., base station 205 may coordinate with neighbor base station 210, or vice versa) to configure the measurement resource configuration for CLI signal strength measurements (e.g., CLI measurements including CLI-RSSI and/or SRS-RSRP measurements) for the respective UEs. In some aspects, the measurement resource configuration may include any aspects of the information elements, resources, parameters, etc., discussed above with respect to CLI-RSSI and/or SRS-RSRP.

In some aspects, the base station may transmit or otherwise provide a measurement configuration signal to its associated UE that carries or conveys an indication of the measurement resource configuration. For example, base station 205 may transmit the measurement configuration signal to UE 215 and/or base station 210 may transmit the measurement configuration signal to UE 220. In some aspects, each UE may use the measurement resource configuration to perform the CLI signal strength measurement for neighboring UEs (e.g., neighboring UEs associated with intra-frequency neighboring cells). In some aspects, a CLI signal strength measurement may be performed during an intra-frequency measurement gap, such as a layer 3 measurement gap. That is, UE 215 may use the measurement resource configuration when performing the CLI signal strength measurement for UE 220, or vice versa.

In some aspects, one or more of the UEs 215 and/or 220 may be operating in a discontinuous reception (DRX) mode. Generally, the DRX mode may include idle or off periods in which one or more components, functions, and the like, of the UE are powered down or otherwise inactive to conserve power and one or more on or active periods in which the UE is activated. In some aspects, each UE may determine whether to perform the CLI signal strength measurement for the neighboring UE during an off period of the DRX mode. That is, it may be up to the UE implementation as to whether to measure CLI-RSSI and/or SRS-RSRP during the off period of the DRX cycle (e.g., rather than the active time of the DRX cycle). For example, each UE may determine whether or not performance requirements (e.g., radio link performance requirements) of the UE can be met while performing the CLI signal strength measurement during the off period of the DRX cycle. Accordingly, UE 215 and/or UE 220 may determine whether to perform the CLI signal strength measurement during the DRX off period based, at least in some aspects, on a radio link performance threshold for a link between the UE and its serving base station.

In some aspects, an intra-frequency measurement a gap may be defined as the regular layer 3 measurement gap or realized using symbol level rate matching when the layer 3 measurement gap is not configured. By symbol level rate matching, PDSCH may be blank in the symbols for rate matching so that there is no FDM reception with different timing for the PDSCH and CLI-RSSI/SRS-RSRP. Moreover, this may not preclude the network transmitting physical downlink control channel (PDCCH) and other downlink channels to the UE, and therefore requires the UE to do FDM reception of these downlink channels with CLI. Accordingly, aspects of the described techniques provide for a layer 3 measurement gap for CLI-RSSI and SRS-RSRP measurements. Accordingly, the CLI signal strength measurement may be performed during an intra-frequency measurement gap using the layer 3 measurement gap. Accordingly, UE 215 and UE 220 may perform CLI signal strength measurements according to the measurement resource configuration and during an intra-frequency measurement gap. That is, in some examples UE 215 may perform the CLI signal strength measurement for UE 220 and/or UE 220 may perform the CLI signal strength measurement for UE 215 during the intra-frequency measurement gap.

In some aspects, each UE may transmit or otherwise provide a report of the CLI signal strength measurement to each respective base station. That is, UE 215 may transmit a report of the CLI signal strength measurement to base station 205 and/or UE 220 may transmit a report of the CLI signal strength measurement to base station 210.

In some aspects, the report of the CLI signal strength measurement may include both periodic and/or event triggered measurement reporting. That is, both periodic and/or event triggered reporting may be supported for CLI-RSSI and SRS-RSRP measurements (e.g., CLI signal strength measurements).

For event triggered reporting, aspects of the described techniques may define new events for the report of the CLI signal strength measurement. Examples of the new events for CLI signal strength measurements (e.g., CLI measurements) include, but are not limited to, CLI-RSSI and/or SRS-RSRP being above a threshold and CLI-RSSI and/or SRS-RSRP being below a threshold. In some aspects, the CLI measurements (e.g., the CLI signal strength measurements) may not need or include the UE measuring both CLI-RSSI and SRS-RSRP. That is, in some aspects of a triggering condition for an event may be detected based on comparison of the CLI signal strength measurement to a threshold, e.g., the CLI signal strength measurement falling below a low threshold and/or exceeding a high threshold.

In some aspects, the report of the CLI signal strength measurement may be transmitted to the base station together with serving cell measurements (e.g., of the base station) taken by the UE. For example, UE 215 may include the CLI signal strength measurement report in a MeasResults object transmitted to base station 205, and the MeasResults object may include both serving cell measurements of base station 205 and a measResultCLI object containing CLI signal strength measurements of UE 220.

In some aspects, the respective base station may transmit or otherwise provide an indication to each UE of which measurement is to be performed. In some aspects, a new measurement quantity may be defined (e.g., CH-MeasQuantity) to indicate which measurement (e.g., CLI-RSSI and/or SRS-RSRP) for the UE to measure and report. That is, each UE may receive an indication from its respective base station of the type of CLI signal strength measurement to be performed, e.g., whether to perform a CLI-RSSI measurement and/or a SRS-RSRP measurement. In some aspects, the measurement resource configuration may be a combined measurement configuration for the CLI-RSSI and SRS-RSRP measurements. In other aspects, the measurement resource configuration may be independent measurement configurations for the CLI-RSSI and SRS-RSRP measurements.

In some aspects, this may include a report configuration (ReportConfigNR) information element that carries or otherwise conveys an indication of which measurement is to be performed and reported. One example of the report configuration information element may include, but is not limited to:

```
-- ASN1START
-- TAG-REPORTCONFIGNR-START
ReportConfigNR ::=              SEQUENCE {
    reportType                  CHOICE {
        periodical              PeriodicalReportConfig,
        eventTriggered          EventTriggerConfig,
        ...,
        reportCGI               ReportCGI
    }
}
ReportCGI ::=                   SEQUENCE {
    cellForWhichToReportCGI     PhysCellId,
    ...
}
EventTriggerConfig::=           SEQUENCE {
    eventId                     CHOICE {
        eventA1                 SEQUENCE {
            a1-Threshold            MeasTriggerQuantity,
            reportOnLeave           BOOLEAN,
            hysteresis              Hysteresis,
            timeToTrigger           TimeToTrigger
        },
        eventA2                 SEQUENCE {
            a2-Threshold            MeasTriggerQuantity,
            reportOnLeave           BOOLEAN,
            hysteresis              Hysteresis,
            timeToTrigger           TimeToTrigger
        },
        eventA3                 SEQUENCE {
            a3-Offset               MeasTriggerQuantityOffset,
            reportOnLeave           BOOLEAN,
            hysteresis              Hysteresis,
            timeToTrigger           TimeToTrigger,
            useWhiteCellList        BOOLEAN
        },
        eventA4                 SEQUENCE {
            a4-Threshold            MeasTriggerQuantity,
            reportOnLeave           BOOLEAN,
            hysteresis              Hysteresis,
            timeToTrigger           TimeToTrigger,
            useWhiteCellList        BOOLEAN
        },
        eventA5                 SEQUENCE {
            a5-Threshold1           MeasTriggerQuantity,
            a5-Threshold2           MeasTriggerQuantity,
            reportOnLeave           BOOLEAN,
            hysteresis              Hysteresis,
            timeToTrigger           TimeToTrigger,
            useWhiteCellList        BOOLEAN
        },
        eventA6                 SEQUENCE {
            a6-Offset               MeasTriggerQuantityOffset,
            reportOnLeave           BOOLEAN,
            hysteresis              Hysteresis,
            timeToTrigger           TimeToTrigger,
            useWhiteCellList        BOOLEAN
        },
        ...,
        eventL1                 SEQUENCE {
            l1-cli-RSSI-Threshold                   CLI-MeasTriggerQuantity
        OPTIONAL,
            l1-srs-RSRP-Threshold                   CLI-MeasTriggerQuantity
        OPTIONAL,
            reportOnLeave           BOOLEAN,
            hysteresis              Hysteresis,
            timeToTrigger           TimeToTrigger
        }
```

```
        eventL2                         SEQUENCE {
            l2-cli-RSSI-Threshold           RSSI-Range
OPTIONAL,
            l2-srs-RSRP-Threshold           RSRP-Range
OPTIONAL,
            reportOnLeave               BOOLEAN,
            hysteresis                  Hysteresis,
            timeToTrigger               TimeToTrigger
        }
    },
    rsType                      NR-RS-Type,
    reportInterval              ReportInterval,
    reportAmount                ENUMERATED {r1, r2, r4, r8, r16, r32, r64,
infinity},
    reportQuantityCell           MeasReportQuantity,
    maxReportCells               INTEGER (1..maxCellReport),
    reportQuantityRS-Indexes      MeasReportQuantity
OPTIONAL, -- Need R
    maxNrofRS-IndexesToReport         INTEGER (1..maxNrofIndexesToReport)
OPTIONAL, -- Need R
    includeBeamMeasurements      BOOLEAN,
    reportAddNeighMeas           ENUMERATED {setup }
OPTIONAL, -- Need R
    ...,
    [[
    cli-MeasReportQuantity              CLI-MeasReportQuantity
    OPTIONAL
    ]]
}
PeriodicalReportConfig ::=      SEQUENCE {
    rsType                      NR-RS-Type,
    reportInterval              ReportInterval,
    reportAmount                ENUMERATED {r1, r2, r4, r8, r16, r32,
r64,
infinity},
    reportQuantityCell           MeasReportQuantity,
    maxReportCells               INTEGER (1..maxCellReport),
    reportQuantityRS-Indexes      MeasReportQuantity
OPTIONAL, -- Need R
    maxNrofRS-IndexesToReport         INTEGER
(1..maxNrofIndexesToReport)            OPTIONAL, -- Need R
    includeBeamMeasurements       BOOLEAN,
    useWhiteCellList              BOOLEAN,
    ...,
    [[
    cli-MeasReportQuantity              CLI-MeasReportQuantity
    OPTIONAL
    ]]
}
NR-RS-Type ::=                  ENUMERATED {ssb, csi-rs}
MeasTriggerQuantity ::=         CHOICE {
    rsrp                        RSRP-Range,
    rsrq                        RSRQ-Range,
    sinr                        SINR-Range
}
CLI-MeasTriggerQuantity ::=         CHOICE {
    cli-rssi                RSSI-Range,          -- to be defined
by RAN4
    srs-rsrp                RSRP-Range       -- to be defined by RAN4
}
MeasTriggerQuantityOffset ::=   CHOICE {
    rsrp                INTEGER (-30..30),
    rsrq                INTEGER (-30..30),
    sinr                INTEGER (-30..30)
}
MeasReportQuantity ::=          SEQUENCE {
    rsrp                BOOLEAN,
    rsrq                BOOLEAN,
    sinr                BOOLEAN
}
CLI-MeasReportQuantity          SEQUENCE {
    cli-rssi            BOOLEAN,
    srs-rsrp            BOOLEAN
}
-- TAG-REPORTCONFIGNR-STOP
-- ASN1 STOP
```

In some aspects, a network configured with dynamic TDD configuration, a strong CLI may occur to a UE if it is close to one or more UEs from another cell (or base station) that have strong uplink transmissions colliding with its downlink reception. In this case, the strong interference power may push the components (e.g., analog circuitry) of the UE to saturation. If the UE that is configured to measure the SRS-RSRP or the CLI-RSSI, the measurement may be inaccurate and/or the UE may not be able to detect the SRS sequence identifier. Therefore, the UE may transmit an overload flag in the report (e.g., the measResultCLI object containing the SRS-RSRP/CLI-RSSI report) to indicate that the interference is too strong to measure. Accordingly, aspects of the described techniques may include a "too strong signal to measure" (or "too strong of a signal to measure") as one of the possible values of CLI-RSSI and/or SRS-RSSI measurement result. Accordingly, in some aspects the report of the CLI signal strength measurement may carry or otherwise convey an indication that the cross-link signal for the neighboring UEs is too strong to measure or a CLI signal strength measurement value associated with the cross-link signal being too strong to measure.

In some aspects, various SRS SCS parameters may be defined as the SCS for SRS to be measured. For example, an SRS-SCS parameter may be defined, which may describe the SCS for the SRS. In some aspects, the SRS-SCS parameter may indicate or otherwise be associated with the UE performing the CLI measurement within the active BWP. In some aspects, the SRS-SCS parameter may indicate that the SCS for the CLI measurement resource configuration (e.g., the measurement resource configuration used for the CLI signal strength measurement) may be the same or different from the SCS of the active BWP. In this context, the UE may not be required to measure SRS-RSRP if the SCS of the SRS is different than the downlink active BWP SCS of the same carrier. In some aspects, the value range is for this parameter may include, but are not limited to, 15, 30, 60 kHz for FR1 and/or 60, 120 kHz for FR2. In some aspects, the description of the parameter states that the UE is not required to measure SRS using different SCS compared to the downlink active BWP SCS of the same carrier. This is based on whether the SRS-SCS parameter needs to be explicitly configured by the network dependent upon whether the SRS-RSRP measurement configuration is cell specific or BWP dependent. If the SRS measurement configuration is cell specific, the SRS-SCS parameter may be configured for the UE. Otherwise, the SRS-SCS parameter may be omitted from the SRS-RSRP configuration because the network may only configure the SRS with SCS same as the downlink active BWP SCS of the same carrier. However, aspects of the described techniques may include, if the SRS-RSRP measurement configuration is BWP dependent, the network may not explicitly configure SRS-SCS.

In some aspects, although SRS may be transmitted in up to 4 ports from a UE, aspects of the described techniques address whether the SRS-RSRP should be measured in up to 4 ports. For SRS-RSRP measurement report, layer 3 measurement and reporting may be applied. Conventionally, layer 3 measurement may be performed using a single port. To make CLI measurement compatible with existing layer 3 measurements, the UE may be configured only to measure SRS-RSRP in a single SRS Port. However, it is to be understood that this does not preclude the UE from measuring multiple SRS ports if each port of the SRS is configured as a separate measurement resource. Accordingly, aspects of the described techniques may include each SRS-RSRP measurement resource only using or otherwise including a single SRS Port. To measure the SRS transmitted from N (N=2, 4) ports from the interfering UE, the network may configure N separate SRS resources that corresponds to the N ports at the interfering UE. In some aspects, this may include or otherwise be based on a parameter (nrofSRS-Ports) having a value range of 1,[2],[4].

Accordingly, aspects of the described techniques provide a mechanism whereby base stations 205 and 210 coordinate to configure a measurement resource configuration associated with a CLI signal strength measurement for UEs 215 and 220, respectively. The measurement resource configuration may be based on any of the information elements, parameters, resources, values, and the like, discussed above, alone or in any combination. UEs 215 and 220 may perform the CLI signal strength measurement according to the measurement resource configuration and transmit a report to their respective base station based at least in part on the CLI signal strength measurement. Base stations 205 and 210 may receive the reports from the respective UEs, and use this information to mitigate or otherwise reduce CLI within their respective coverage areas.

Figure 3:
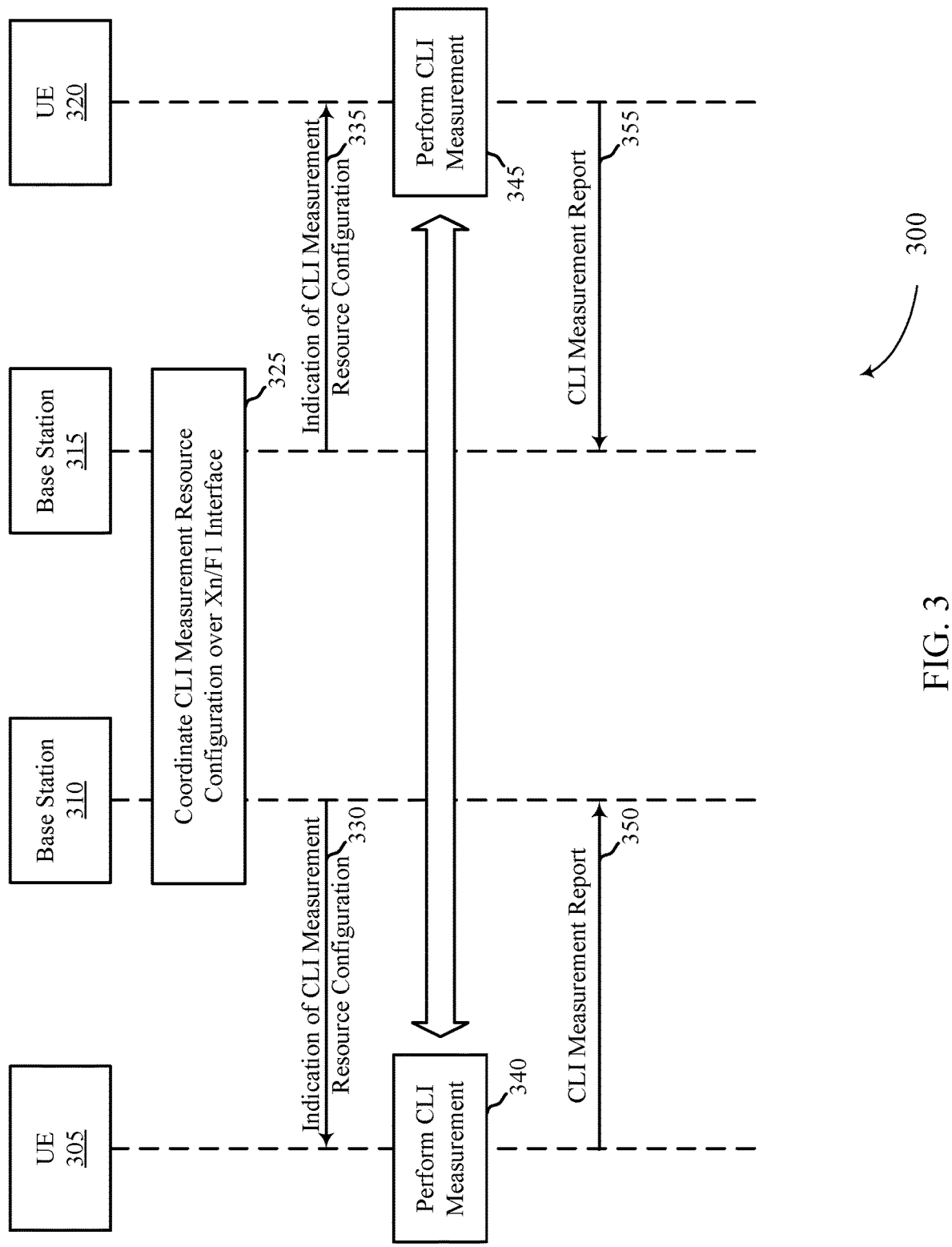
FIG. 3 illustrates an example of a process that supports UE measurement for CLI in accordance with aspects of the present disclosure.

FIG. 3 illustrates an example of a process 300 that supports UE measurement for CLI in accordance with aspects of the present disclosure. In some examples, process 300 may implement aspects of wireless communication systems 100 and/or 200. Aspects of process 300 may be implemented by UE 305, base station 310, base station 315, and/or UE 320, which may be examples of the corresponding devices described herein.

In some aspects, base station 310 may be a serving base station of UE 305 and base station 315 may be a serving base station of UE 320. In some aspects, UE 305 may be a neighboring UE of UE 320, and vice versa. In some aspects, base station 310 may be a neighboring base station a base station 315, and vice versa.

At 325, base stations 310 and 315 may coordinate to configure a measurement resource configuration associated with a CLI signal strength measurement for a UE associated with the base station. In some aspects, this may include base station 310 coordinating with base station 315 to configure the measurement resource configuration associated with the CLI signal strength measurement for UE 305. In some aspects, this may include base station 315 coordinating with base station 310 to configure the measurement resource configuration associated with the CLI signal strength measurement for UE 320. In some aspects, base stations 310 and 315 may coordinate over an Xn interface and/or an F1 interface.

At 330, base station 310 may transmit or otherwise provide a measurement configuration signal to UE 305 that carries or conveys the measurement resource configuration. At 335, base station 315 may transmit or otherwise provide the measurement configuration signal to UE 320 that carries or conveys the measurement resource configuration. In some aspects, the measurement resource signal may use or otherwise be based on one or more of the information elements, values, parameters, and the like, discussed with reference to wireless communication system 200. For example, the measurement configuration signal may use a measurement object (MeasObjCLI) for CLI-RSSI and/or SRS-RSRP measurements. In some examples, the measurement configuration signal may carry or otherwise convey an indication of a filtering configuration (e.g., a layer 3 filtering configuration) for the CLI signal strength measurement (e.g., CLI-RSSI and/or SRS-RSRP measurements).

In some aspects, the measurement configuration signal may carry or convey an indication (e.g., CLI-MeasQuantity)

to indicate which measurement(s) (e.g., CLI-RSSI and/or SRS-RSRP) that the UE is expected to measure and report.

At 340 and at 345, UEs 305 and 320 may perform the CLI signal strength measurement (e.g., for the neighboring UE) according to the measurement resource configuration. In some aspects, the CLI signal strength measurement may be performed during an intra-frequency measurement gap.

In some aspects, the CLI signal strength measurement may include UEs 305 and 320 monitoring for interfering signals from any other neighboring UE performing the wireless communications on the links between UEs 305 and 320 and base stations 310 and 315, respectively (e.g., CLI-RSSI measurements). In some aspects, the CLI signal strength measurements may include UE 305 transmitting SRS and UE 320 measuring the signal strength of the SRS (e.g., SRS-RSRP measurements), or vice versa. As discussed, in some examples the interfering CLI may be too strong for a UE to accurately measure, which may trigger a "too strong to measure" flag at the measuring UE.

In some aspects, one or more of UEs 305 and/or 320 may be operating in a DRX mode. In this context, it may be up to the respective UE to determine whether to perform the CLI signal strength measurement during an off period of the DRX cycle or to wait until an active period (or on period) of the DRX cycle to perform the CLI signal strength measurement. In some aspects, the determination of whether to perform the CLI signal strength measurement may be based on whether or not the respective UE can perform such measurement while maintaining or otherwise supporting radio link performance requirements.

At 350, UE 305 may transmit (and base station 310 may receive) a report of the CLI signal strength measurement. Similarly and at 355, UE 320 may transmit (and base station 315 may receive) a report of the CLI signal strength measurement. Broadly, the reports may carry or convey an indication of the results of the CLI signal strength measurement performed by UE 305 and/or UE 320, respectively. In some aspects, the report may be periodic and/or event triggered reporting, e.g., based on the CLI-RSSI and/or SRS-RSRP measurements being above a high threshold and/or being below a low threshold. In some examples, the report of the CLI signal strength measurement may be transmitted to the base station 310 together with serving cell measurements (e.g., of the base station 310) taken by the UE 305. For example, the UE 305 may include the CLI signal strength measurement report in a MeasResults object transmitted to base station 310, and the MeasResults object may include both serving cell measurements of base station 310 and a measResultCLI object containing CLI signal strength measurements of UE 320.

Figure 4:
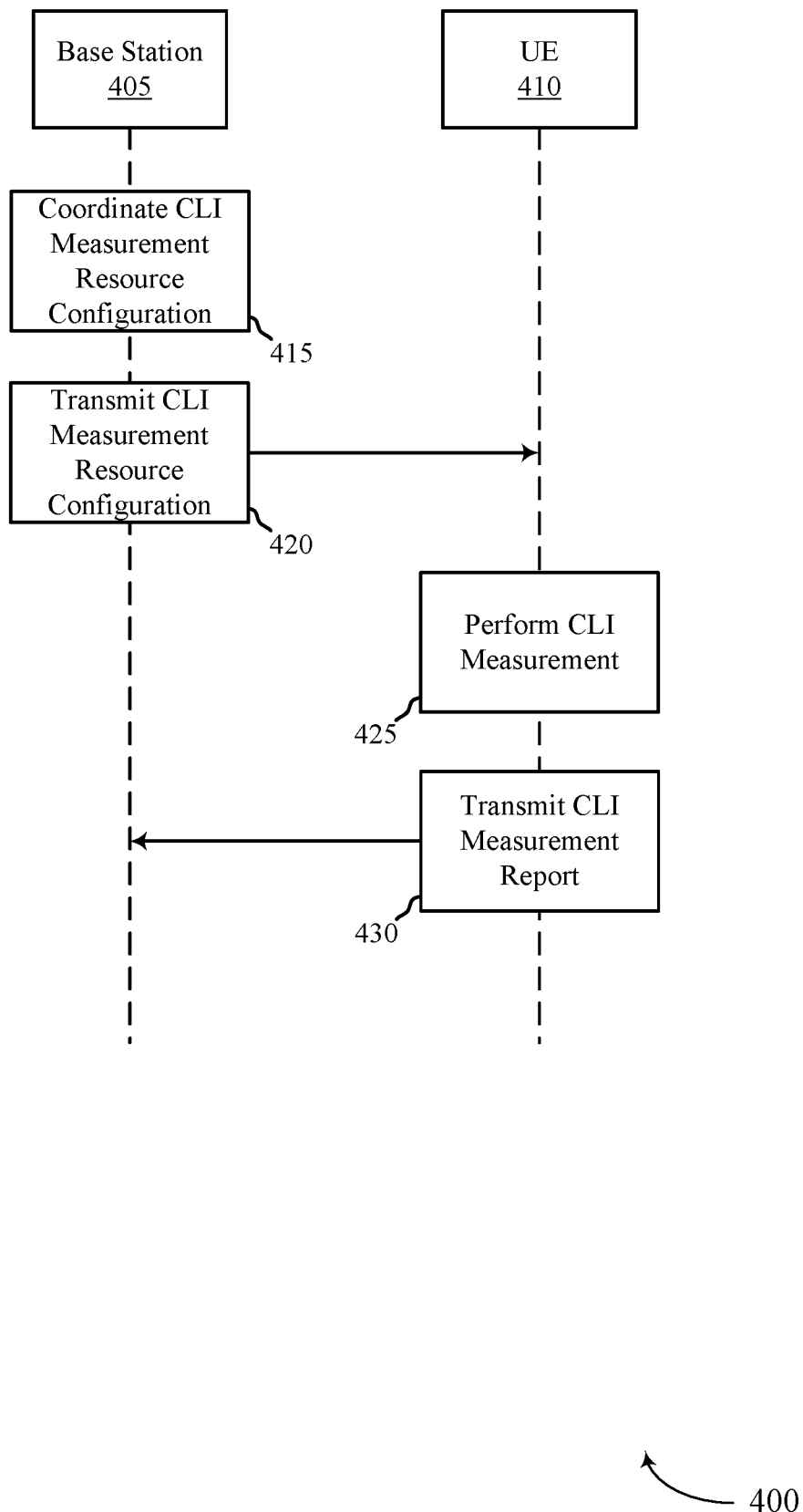
FIG. 4 illustrates an example of a process that supports UE measurement for CLI in accordance with aspects of the present disclosure.

FIG. 4 illustrates an example of a process 400 that supports UE measurement for CLI in accordance with aspects of the present disclosure. In some examples, process 400 may implement aspects of wireless communication systems 100, 200, and/or process 300. Aspects of process 400 may be implemented by base station 405 and/or UE 410, which may be examples of corresponding devices described herein. In some aspects, base station 405 may be a serving base station of UE 410.

At 415, base station 405 may coordinate with a neighboring base station to configure a measurement resource configuration associated with a CLI signal strength measurement for UE 410. In some aspects, the coordination may be over an Xn interface and/or an F1 interface.

At 420, base station 405 may transmit (and UE 410 may receive) a measurement configuration signal carrying or conveying the measurement resource configuration. In some aspects, this may include UE 410 determining a filtering configuration for the CLI signal strength measurement based on the measurement resource configuration. In this aspect, the CLI signal strength measurement may be performed based at least in part on the filtering configuration.

At 425, UE 410 may perform the CLI signal strength measurement for UE(s) in intra-frequency neighboring cell(s) according to the measurement resource configuration. In some aspects, the CLI signal strength measurement may be performed during an intra-frequency measurement gap. Examples of the CLI signal strength measurement include, but are not limited to, CLI-RSSI measurements and/or SRS-RSRP measurements.

In some aspects, UE 410 may determine to perform the CLI signal strength measurement during a DRX off period based at least in part on a radio link performance threshold associated with a link between UE 410 and base station 405.

In some aspects, UE 410 may determine, based at least in part on a slot duration and/or a SCS associated with a link between UE 410 the base station 405, a periodicity for the CLI signal strength measurement. The report may be transmitted based at least in part on the periodicity.

In some aspects, the CLI signal strength measurement may include an SRS-RSRP measurement time that is depended on a BWP. In some aspects, the CLI signal strength measurement is performed using a single antenna port of UE 410.

At 430, UE 410 may transmit (and base station 405 may receive) a report of the CLI signal strength measurement. In some aspects, UE 410 may detect a triggering condition for the event based at least in part on a comparison of the CLI signal strength measurement to a threshold, and transmitting the report may be based at least in part on the event. Examples of the triggering condition for the event include, but are not limited to, a first triggering condition associated with the CLI signal strength measurement falling below a low threshold, a second triggering condition associated with the CLI signal strength measurement exceeding a high threshold, and the like. In some aspects, the report of the CLI signal strength measurement may be transmitted to the base station 405 together with serving cell measurements (e.g., of the base station 405) taken by the UE 410. For example, UE 415 may include the CLI signal strength measurement report in a MeasResults object transmitted to base station 405, as discussed herein.

In some aspects, UE 410 may receive from base station 405 an indication of a type of CLI signal strength measurement to be performed. This indication may be received via explicit signaling of the requested type of measurement, or implicitly indicated to the UE 410, such as through an indicated association of a triggering condition or an event with a certain type of measurement. In this aspect, the CLI signal strength measurement may be performed and reported based at least in part on the type CLI signal strength measurement. Examples of the type of CLI signal strength measurement include, but are not limited to, a CLI-RSSI measurement type, and SRS-RSRP measurement type, and the like. In some aspects, the measurement configuration signal may carry or convey a first measurement configuration associated with the CLI-RSSI measurement type and a second measurement configuration associated with the SRS-RSRP measurement type.

In some aspects, the report of the CLI signal strength measurement may carry or convey an indication that a cross-link signal for the neighboring UEs is too strong to measure or a CLI signal strength measurement value associated with the cross-link signal being too strong to measure.

Figure 5:
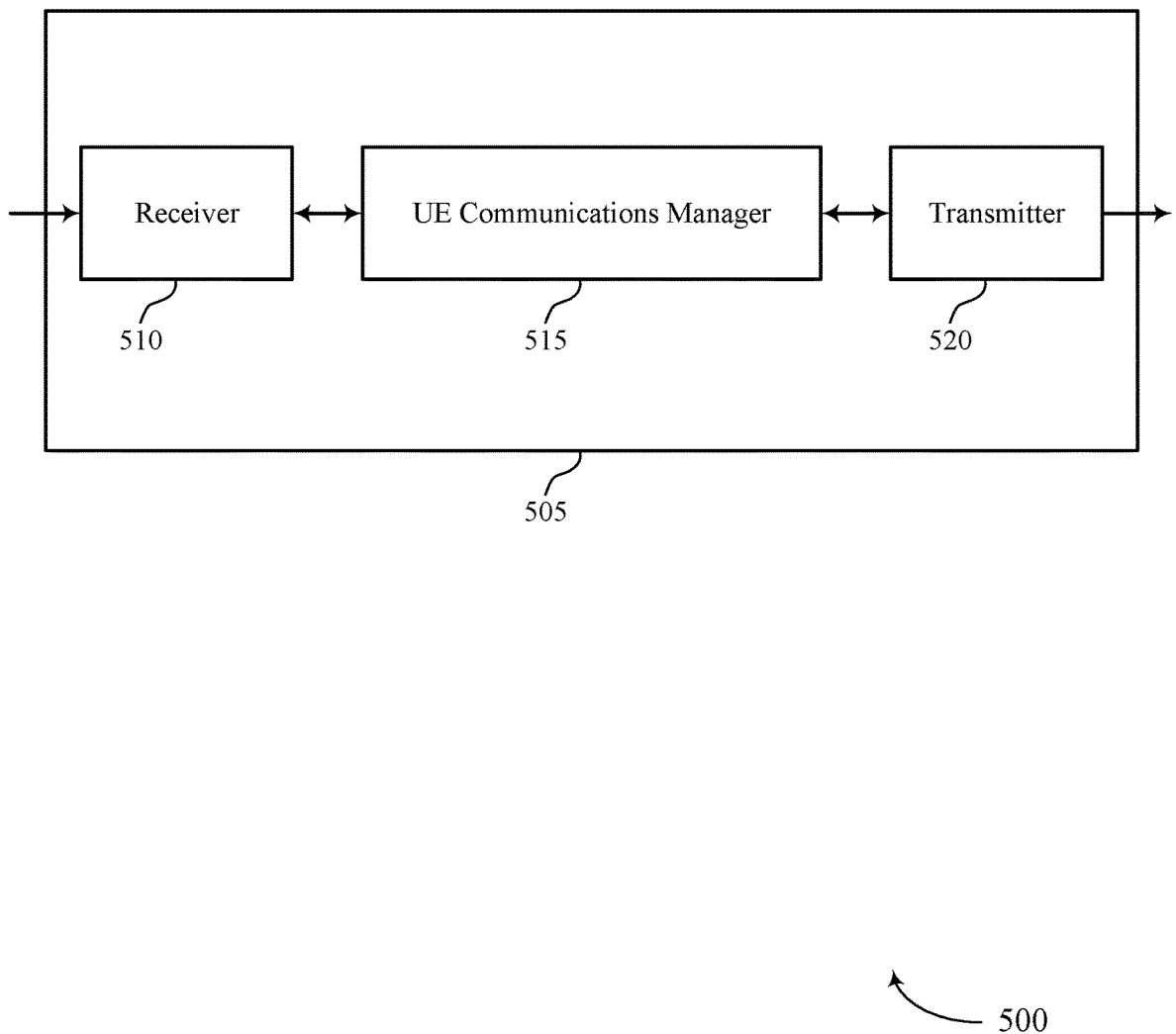
FIGS. 5 and 6 show block diagrams of devices that support UE measurement for CLI in accordance with aspects of the present disclosure.

FIG. 5 shows a block diagram 500 of a device 505 that supports UE measurement for CLI in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to UE measurement for CLI, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive from a base station a measurement configuration signal including a measurement resource configuration associated with a CLI signal strength measurement, perform the CLI signal strength measurement for one or more UEs associated with one or more intra-frequency neighboring cells according to the measurement resource configuration, and transmit a report of the CLI signal strength measurement to the base station. In some examples, the CLI signal strength measurement may be performed during an intra-frequency measurement gap. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas. In some examples, the UE communications manager 515 may include a mobile device modem chip or integrated circuit. In some examples, and the receiver 510 and transmitter 520 may include analog electronic components (e.g., amplifiers, filters, antennas, etc.) coupled with the UE communications manager 515 to enable the receipt and transmission of wireless signals under the management of UE communications manager 515.

Figure 6:
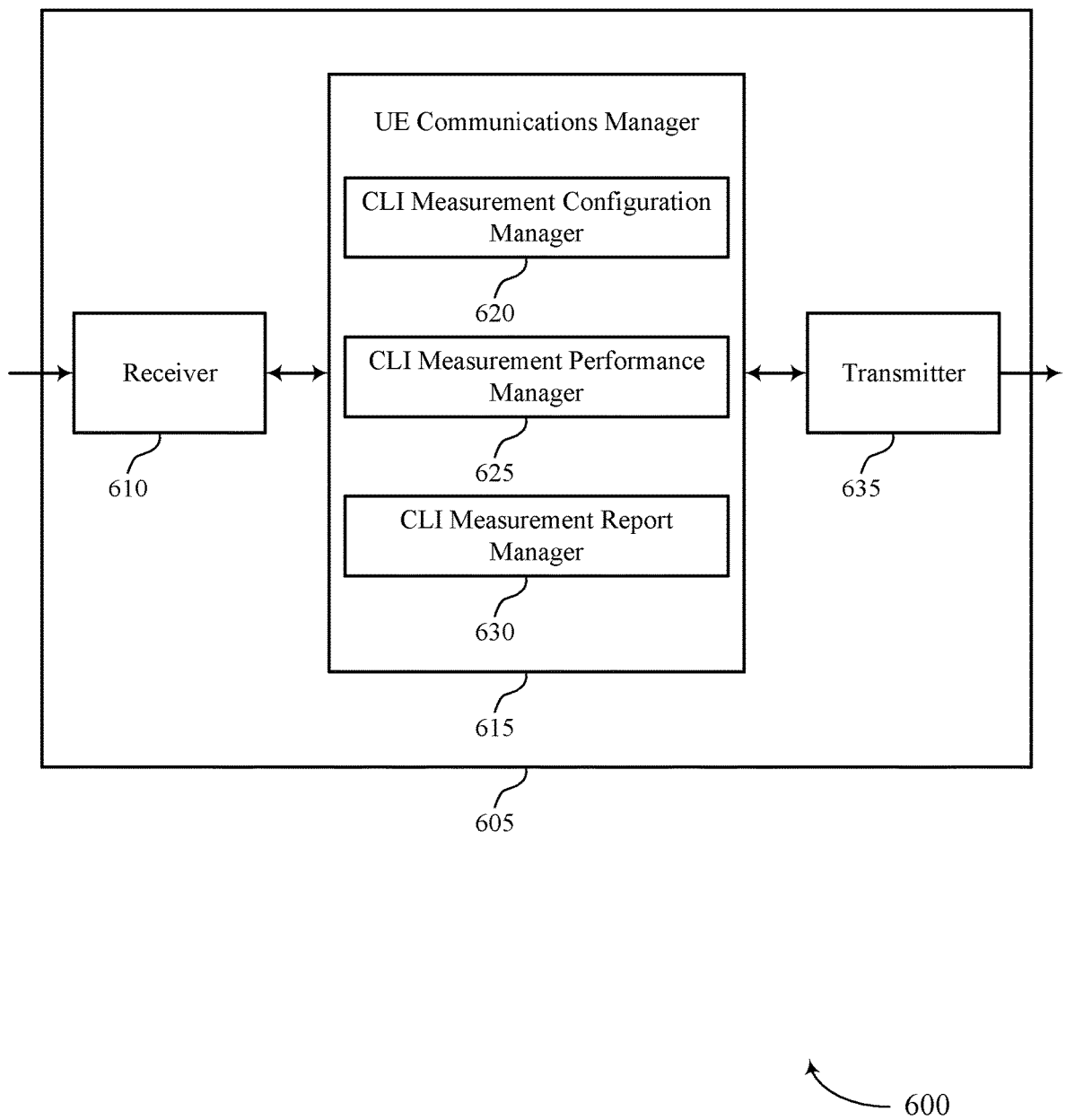

FIG. 6 shows a block diagram 600 of a device 605 that supports UE measurement for CLI in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to UE measurement for CLI, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a CLI measurement configuration manager 620, a CLI measurement performance manager 625, and a CLI measurement report manager 630. The UE communications manager 615 may be an example of aspects of the UE communications manager 810 described herein.

The CLI measurement configuration manager 620 may receive from a base station, via receiver 610, a measurement configuration signal including a measurement resource configuration associated with a CLI signal strength measurement.

The CLI measurement performance manager 625 may perform the CLI signal strength measurement for one or more UEs associated with one or more intra-frequency neighboring cells according to the measurement resource configuration. In some examples, the CLI signal strength measurement is performed during an intra-frequency measurement gap.

The CLI measurement report manager 630 may control the transmitter 635 to transmit a report of the CLI signal strength measurement to the base station.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
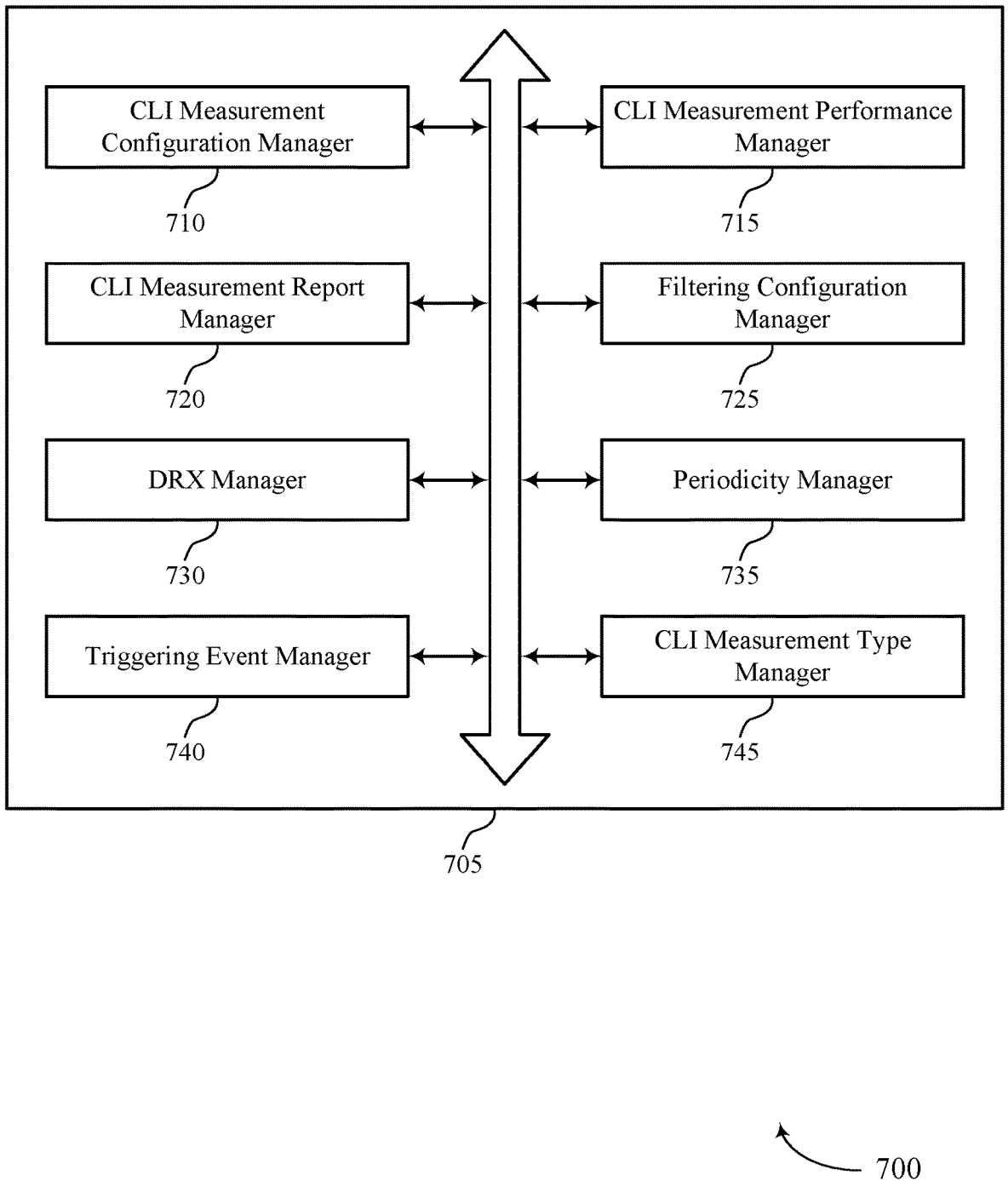
FIG. 7 shows a block diagram of a communications manager that supports UE measurement for CLI in accordance with aspects of the present disclosure.

FIG. 7 shows a block diagram 700 of a UE communications manager 705 that supports UE measurement for CLI in accordance with aspects of the present disclosure. The UE communications manager 705 may be an example of aspects of a UE communications manager 515, a UE communications manager 615, or a UE communications manager 810 described herein. The UE communications manager 705 may include a CLI measurement configuration manager 710, a CLI measurement performance manager 715, a CLI measurement report manager 720, a DRX manager 725, a periodicity manager 730, an event manager 735, and a CLI measurement type manager 740. Each of these modules may communicate, directly or indirectly, with one another (e.g., via one or more buses).

The CLI measurement configuration manager 710 may receive from a base station a measurement configuration signal including a measurement resource configuration associated with a CLI signal strength measurement. In some cases, the measurement resource configuration includes one or more of a reporting configuration for the CLI signal strength measurement, a filtering configuration for the CLI signal strength measurement, a measurement gap configuration for the CLI signal strength measurement, or a quantity configuration for the CLI signal strength measurement. In some cases, the CLI signal strength measurement includes a SRS based RSRP measurement type that is dependent on a bandwidth part. In some cases, the CLI signal strength measurement is performed using a single antenna port of the UE.

The CLI measurement performance manager 715 may perform the CLI signal strength measurement for one or more UEs associated with one or more intra-frequency neighboring cells according to the measurement resource configuration, where the CLI signal strength measurement is performed during an intra-frequency measurement gap.

The CLI measurement report manager 720 may transmit a report of the CLI signal strength measurement to the base station. In some cases, the report of the CLI signal strength measurement includes an indication that a cross-link signal for the neighboring UEs is too strong to measure or a CLI signal strength measurement value associated with the cross-link signal being too strong to measure. In some cases, the report of the CLI signal strength measurement may be transmitted together with a serving cell measurement report.

The DRX manager 725 may determine to perform the CLI signal strength measurement during a DRX off period based on a measurement accuracy threshold.

The periodicity manager 730 may determine, based on a slot duration and a subcarrier spacing associated with a link between the UE and the base station, a periodicity for the CLI signal strength measurement, where transmitting the report is based on the determined periodicity.

The event manager 735 may detect a triggering condition for an event based on a comparison of the CLI signal strength measurement to a threshold. Transmitting the report may be based on the occurrence of the event, as defined by the triggering condition. In some cases, the triggering condition for the event includes one or more of a first triggering condition associated with the CLI signal strength measurement falling below a low threshold or a second triggering condition associated with the CLI signal strength measurement exceeding a high threshold. In response to the event being triggered The CLI measurement type manager 740 may receive from the base station an explicit or implicit indication of a type of CLI signal strength measurement, where performing the CLI signal strength measurement and reporting the CLI signal strength measurement are based on the indicated type of CLI signal strength measurement. In some cases, the indicated type of CLI signal strength measurement includes one or more of a CLI-RSSI measurement type or a SRS-RSRP measurement type. In some cases, the measurement configuration signal includes a first measurement configuration associated with the CLI RSSI measurement type and a second measurement configuration associated with the sounding reference signal RSRP measurement type.

Figure 8:
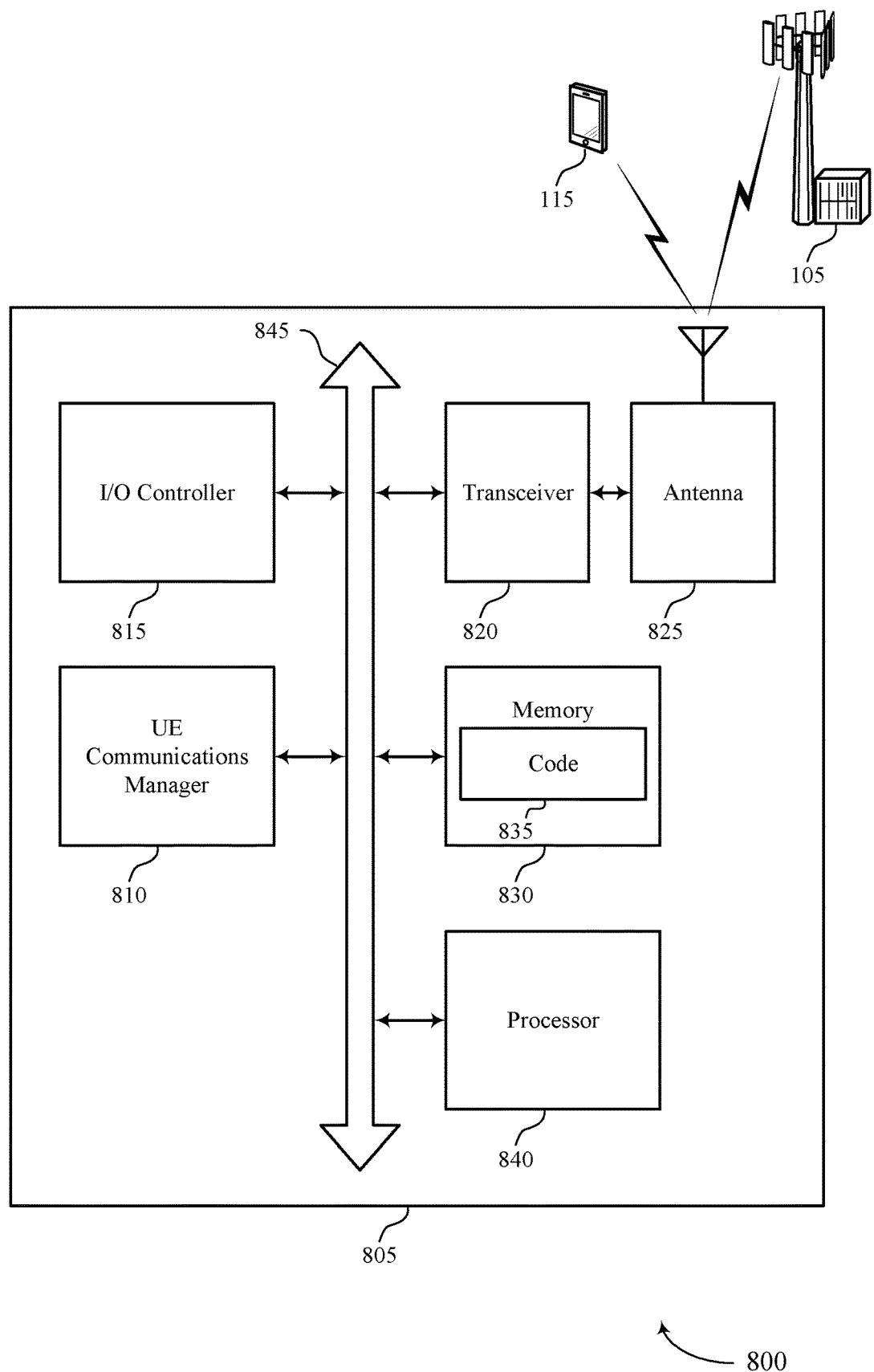
FIG. 8 shows a diagram of a system including a device that supports UE measurement for CLI in accordance with aspects of the present disclosure.

FIG. 8 shows a diagram of a system 800 including a device 805 that supports UE measurement for CLI in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive from a base station a measurement configuration signal including a measurement resource configuration associated with a CLI signal strength measurement, perform the CLI signal strength measurement for one or more UEs associated with one or more intra-frequency neighboring cells according to the measurement resource configuration, and transmit a report of the CLI signal strength measurement to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting UE measurement for CLI).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
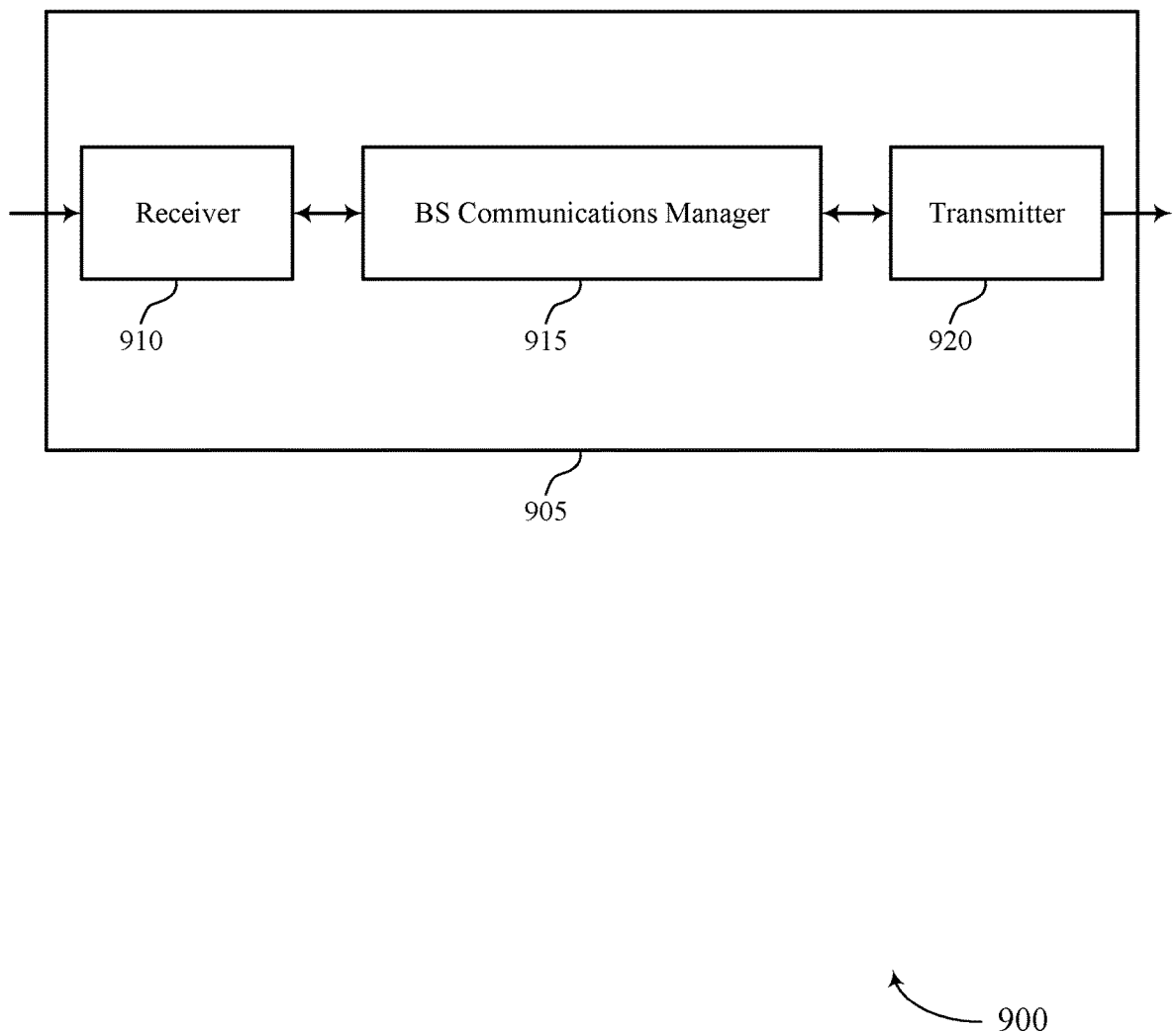
FIGS. 9 and 10 show block diagrams of devices that support UE measurement for CLI in accordance with aspects of the present disclosure.

FIG. 9 shows a block diagram 900 of a device 905 that supports UE measurement for CLI in accordance with aspects of the present disclosure. The device 905 may be an example of aspects of a base station 105 as described herein. The device 905 may include a receiver 910, a base station (BS) communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to UE measurement for CLI, etc.). Information may be passed on to other components of the device 905. The receiver 910 may be an example of aspects of the transceiver 1220 described with reference to FIG. 12. The receiver 910 may utilize a single antenna or a set of antennas.

The BS communications manager 915 may coordinate with a neighboring base station to configure a measurement resource configuration associated with a CLI signal strength measurement for a UE associated with the base station, control transmitter 920 to transmit to the UE a measurement configuration signal including the measurement resource configuration, and receive, via receiver 910, a report of the CLI signal strength measurement from the UE. The CLI signal strength measurement may be based on the measurement resource configuration. In some examples, the CLI signal strength measurement may be performed during an intra-frequency measurement gap. The BS communications manager 915 may be an example of aspects of the BS communications manager 1210 described herein.

The BS communications manager 915, or its sub-components, may be implemented in hardware, code (e.g., software or firmware) executed by a processor, or any combination thereof. If implemented in code executed by a processor, the functions of the BS communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The BS communications manager 915, or its sub-components, may be physically located at various positions, including being distributed such that portions of functions are implemented at different physical locations by one or more physical components. In some examples, the BS communications manager 915, or its sub-components, may be a separate and distinct component in accordance with various aspects of the present disclosure. In some examples, the BS communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas. In some examples, the BS communications manager 915 may include a mobile device modem chip or integrated circuit. In some examples, and the receiver 910 and transmitter 920 may include analog electronic components (e.g., amplifiers, filters, antennas, etc.) coupled with the BS communications manager 915 to enable the receipt and transmission of wireless signals under the management of BS communications manager 915

Figure 10:
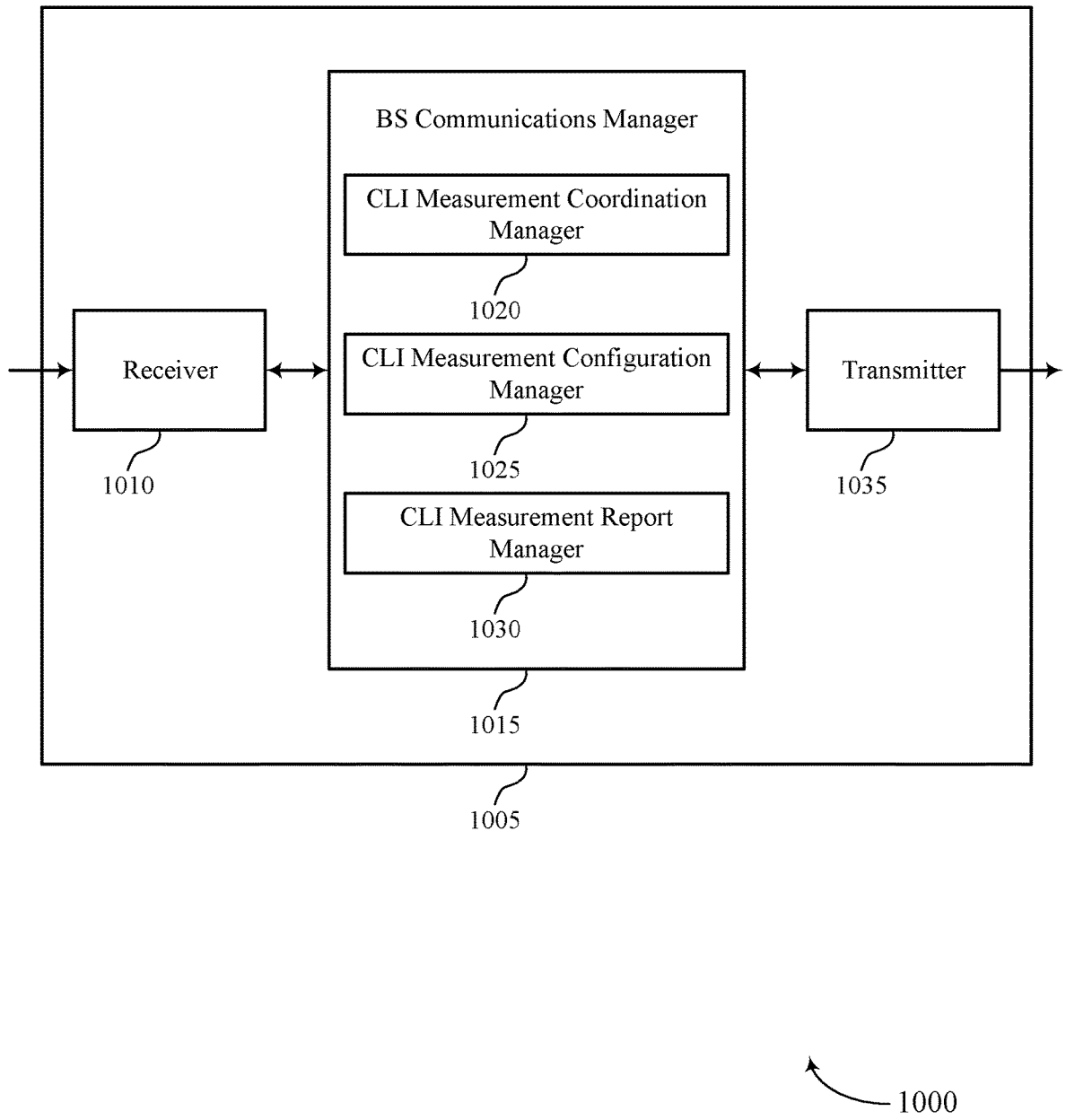

FIG. 10 shows a block diagram 1000 of a device 1005 that supports UE measurement for CLI in accordance with aspects of the present disclosure. The device 1005 may be an example of aspects of a device 905, or a base station 105 as described herein. The device 1005 may include a receiver 1010, a BS communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to UE measurement for CLI, etc.). Information may be passed on to other components of the device 1005. The receiver 1010 may be an example of aspects of the transceiver 1220 described with reference to FIG. 12. The receiver 1010 may utilize a single antenna or a set of antennas.

The BS communications manager 1015 may be an example of aspects of the BS communications manager 915 as described herein. The BS communications manager 1015 may include a CLI measurement coordination manager 1020, a CLI measurement configuration manager 1025, and a CLI measurement report manager 1030. The BS communications manager 1015 may be an example of aspects of the BS communications manager 1210 described herein.

The CLI measurement coordination manager 1020 may coordinate with a neighboring base station to configure a measurement resource configuration associated with a CLI signal strength measurement for a UE associated with the base station.

The CLI measurement configuration manager 1025 may transmit to the UE a measurement configuration signal including the measurement resource configuration.

The CLI measurement report manager 1030 may receive a report of the CLI signal strength measurement from the UE, the CLI signal strength measurement being based on the measurement resource configuration. In some examples, the CLI signal strength measurement may be performed during an intra-frequency measurement gap. In some cases, the report of the CLI signal strength measurement may be received together with a serving cell measurement report.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
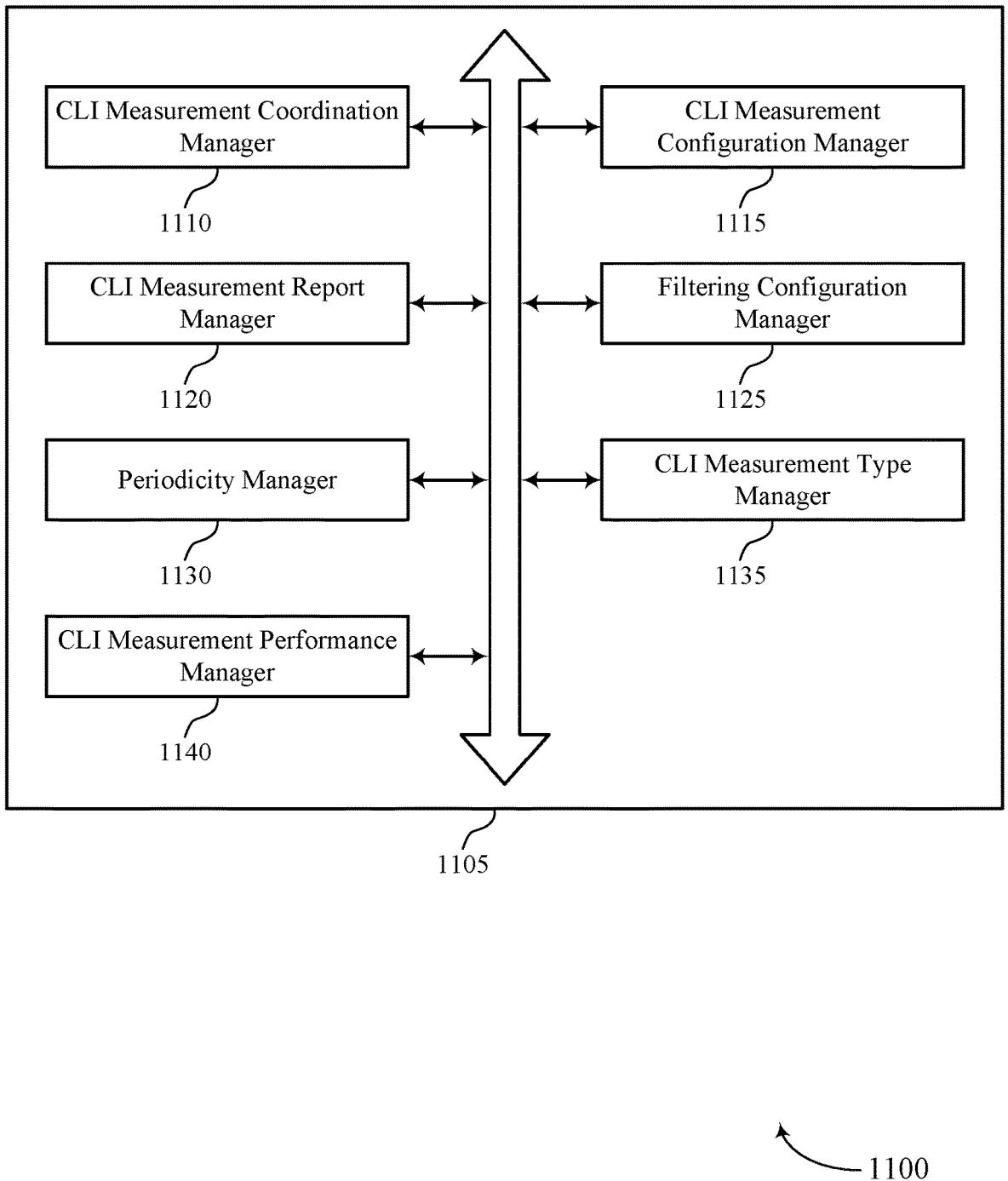
FIG. 11 shows a block diagram of a communications manager that supports UE measurement for CLI in accordance with aspects of the present disclosure.

FIG. 11 shows a block diagram 1100 of a BS communications manager 1105 that supports UE measurement for CLI in accordance with aspects of the present disclosure. The BS communications manager 1105 may be an example of aspects of a BS communications manager 915, a BS communications manager 1015, or a BS communications manager 1210 described herein. The BS communications manager 1105 may include a CLI measurement coordination manager 1110, a CLI measurement configuration manager 1115, a CLI measurement report manager 1120, a filtering configuration manager 1125, a periodicity manager 1130, a CLI measurement type manager 1135, and a CLI measurement performance manager 1140. Each of these modules may communicate, directly or indirectly, with one another (e.g., via one or more buses).

The CLI measurement coordination manager 1110 may coordinate with a neighboring base station to configure a measurement resource configuration associated with a CLI signal strength measurement for a UE associated with the base station. In some examples, coordinating with the neighboring base station is over at least one of an Xn interface, or an F1 interface, or a combination thereof, and where the coordinating includes an exchange of one or more of an interface setup message, a configuration update message, or a combination thereof.

The CLI measurement configuration manager 1115 may transmit to the UE a measurement configuration signal including the measurement resource configuration. In some cases, the measurement resource configuration includes one or more of a reporting configuration for the CLI signal strength measurement, a filtering configuration for the CLI signal strength measurement, a measurement gap configuration for the CLI signal strength measurement, or a quantity configuration for the CLI signal strength measurement.

The CLI measurement report manager 1120 may receive a report of the CLI signal strength measurement from the UE, the CLI signal strength measurement being based on the measurement resource configuration. In some examples, the CLI signal strength measurement may be performed during an intra-frequency measurement gap. In some examples, the CLI measurement report manager 1120 may receive the report based on fulfillment of a triggering condition for an event based on a comparison of the CLI signal strength measurement to a threshold. In some cases, a first triggering condition associated with the CLI signal strength measurement falling below a low threshold or a second triggering condition associated with the CLI signal strength measurement exceeding a high threshold. In some cases, the report of the CLI signal strength measurement includes an indication that a cross-link signal for one or more UEs associated with one or more intra-frequency neighboring cells is too strong to measure or a CLI signal strength measurement value associated with the cross-link signal being too strong to measure. In some cases, the report of the CLI signal strength measurement may be transmitted together with a serving cell measurement report.

The filtering configuration manager 1125 may determine a filtering configuration for the CLI signal strength measurement based on the measurement resource configuration, where the CLI signal strength measurement is based on the determined filtering configuration.

The periodicity manager 1130 may determine, based on a slot duration and a subcarrier spacing associated with a link between the UE and the base station, a periodicity for the CLI signal strength measurement, where receiving the report is based on the determined periodicity.

The CLI measurement type manager 1135 may transmit to the UE an indication of a type of CLI signal strength measurement, where the CLI signal strength measurement and report of the CLI signal strength measurement are based on the indicated type of CLI signal strength measurement. In some cases, a CLI-RSSI measurement type or a SRS-RSRP measurement type. In some cases, the measurement configuration signal includes a first measurement configuration associated with the CLI RSSI measurement type and a second measurement configuration associated with the sounding reference signal RSRP measurement type.

The CLI measurement performance manager 1140 may monitor, control, or otherwise manage aspects of the CLI signal strength measurement including a SRS-RSRP measurement type that is dependent on a BWP.

Figure 12:
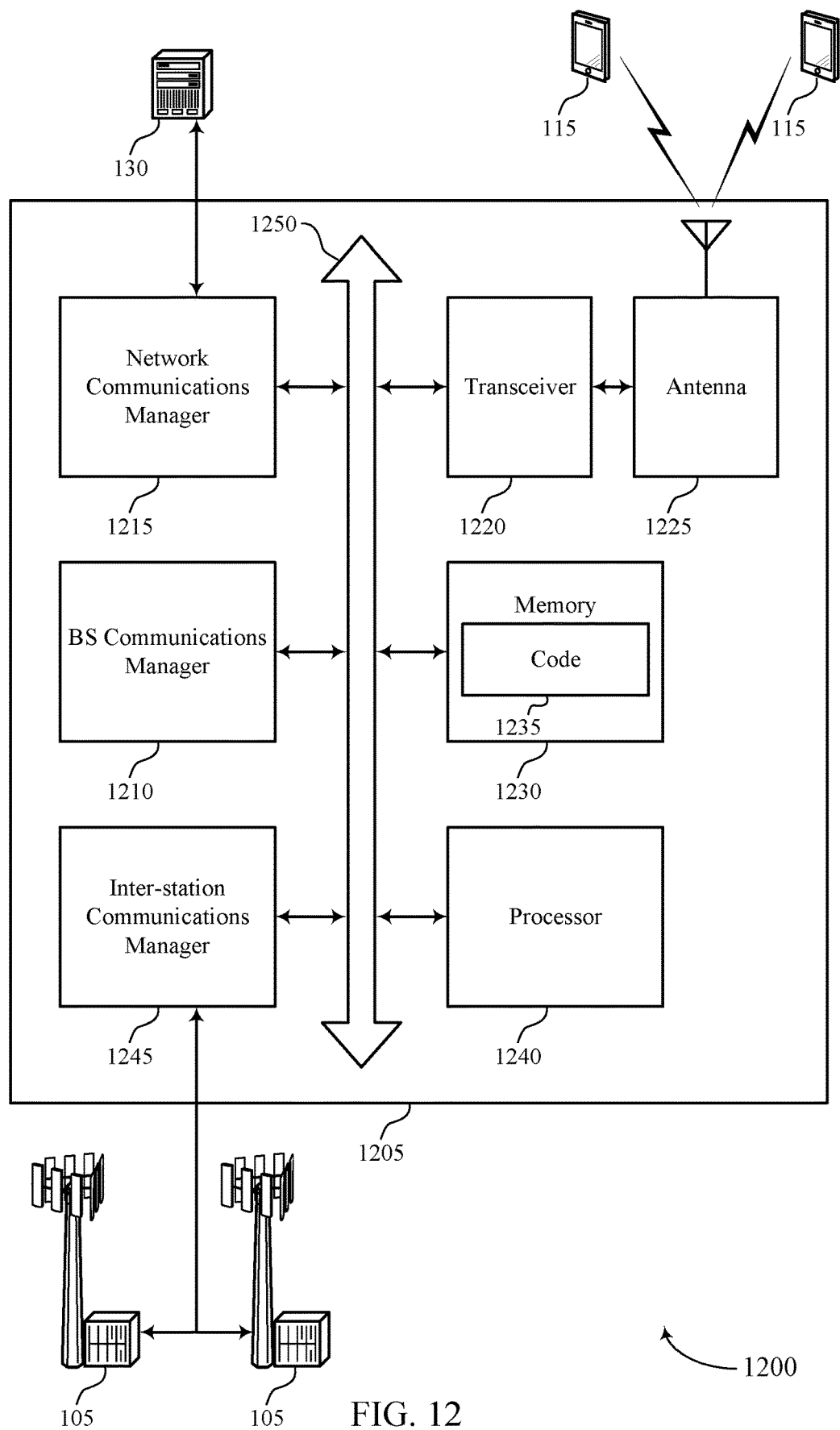
FIG. 12 shows a diagram of a system including a device that supports UE measurement for CLI in accordance with aspects of the present disclosure.

FIG. 12 shows a diagram of a system 1200 including a device 1205 that supports UE measurement for CLI in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a BS communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The BS communications manager 1210 may coordinate with a neighboring base station to configure a measurement resource configuration associated with a CLI signal strength measurement for a UE associated with the base station, transmit to the UE a measurement configuration signal including the measurement resource configuration, and receive a report of the CLI signal strength measurement from the UE, the CLI signal strength measurement being based on the measurement resource configuration. In some examples, the CLI signal strength measurement may be performed during an intra-frequency measurement gap.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting UE measurement for CLI).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
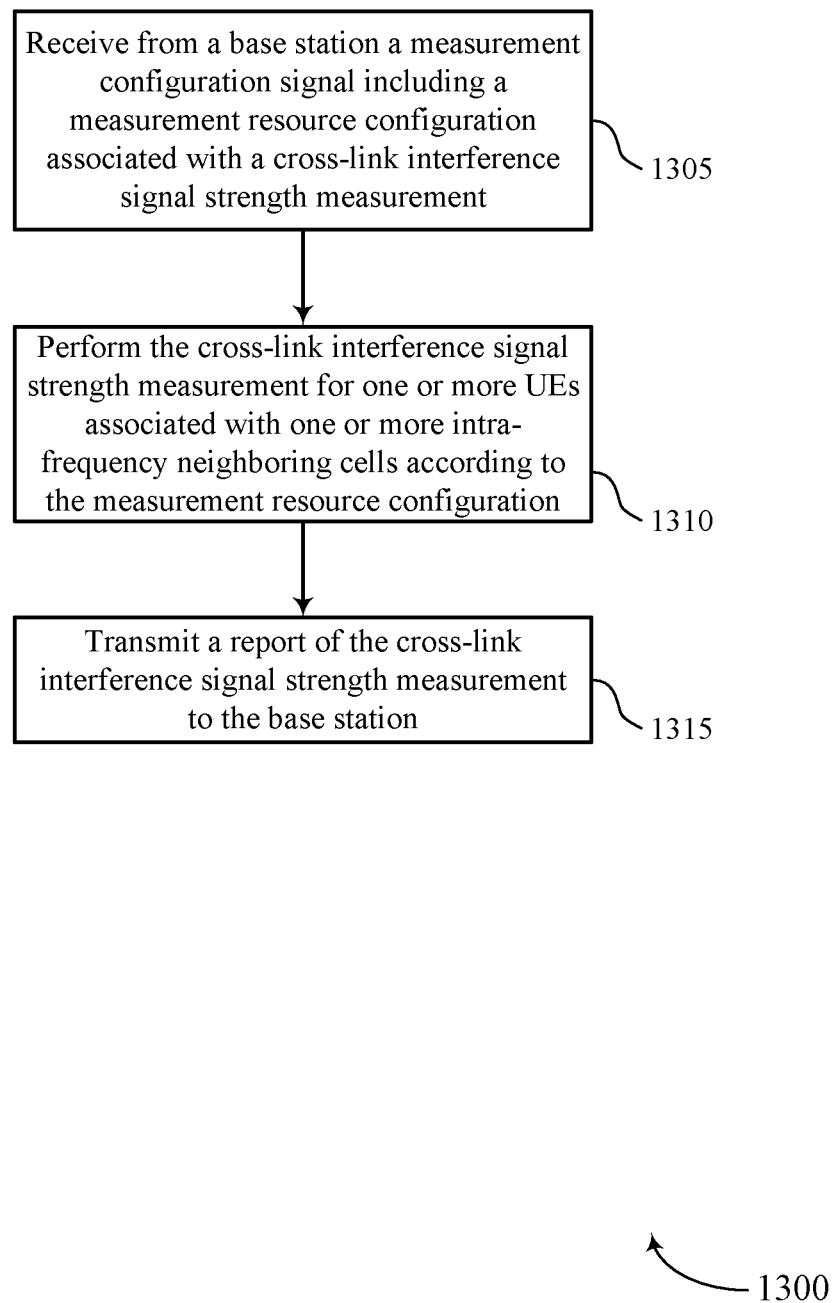
FIGS. 13 through 17 show flowcharts illustrating methods that support UE measurement for CLI in accordance with aspects of the present disclosure.

FIG. 13 shows a flowchart illustrating a method 1300 that supports UE measurement for CLI in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive from a base station a measurement configuration signal including a measurement resource configuration associated with a CLI signal strength measurement. The operations of 1305 may be performed according to the methods described herein. In some examples, aspects of the operations of 1305 may be performed by a CLI measurement configuration manager as described with reference to FIGS. 5 through 8.

At 1310, the UE may perform the CLI signal strength measurement for one or more UEs associated with one or more intra-frequency neighboring cells according to the measurement resource configuration. In some examples, the CLI signal strength measurement is performed during an intra-frequency measurement gap. The operations of 1310 may be performed according to the methods described herein. In some examples, aspects of the operations of 1310 may be performed by a CLI measurement performance manager as described with reference to FIGS. 5 through 8.

At 1315, the UE may transmit a report of the CLI signal strength measurement to the base station. The operations of 1315 may be performed according to the methods described herein. In some examples, aspects of the operations of 1315 may be performed by a CLI measurement report manager as described with reference to FIGS. 5 through 8.

Figure 14:
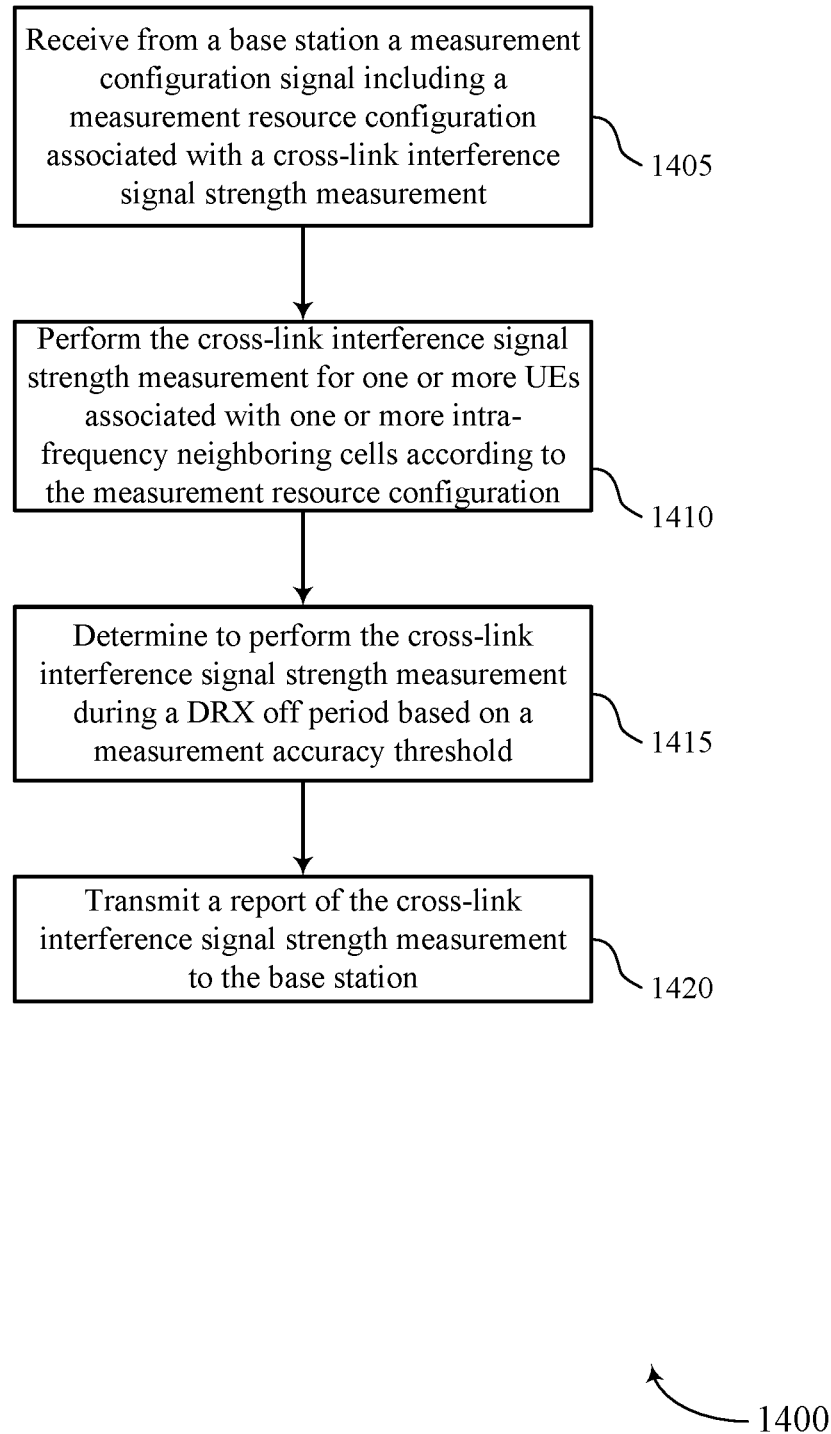

FIG. 14 shows a flowchart illustrating a method 1400 that supports UE measurement for CLI in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive from a base station a measurement configuration signal including a measurement resource configuration associated with a CLI signal strength measurement. The operations of 1405 may be performed according to the methods described herein. In some examples, aspects of the operations of 1405 may be performed by a CLI measurement configuration manager as described with reference to FIGS. 5 through 8.

At 1410, the UE may perform the CLI signal strength measurement for one or more UEs associated with one or more intra-frequency neighboring cells according to the measurement resource configuration. In some examples, the CLI signal strength measurement is performed during an intra-frequency measurement gap. The operations of 1410 may be performed according to the methods described herein. In some examples, aspects of the operations of 1410 may be performed by a CLI measurement performance manager as described with reference to FIGS. 5 through 8.

At 1415, the UE may determine to perform the CLI signal strength measurement during a DRX off period based on a measurement accuracy threshold. The operations of 1415 may be performed according to the methods described herein. In some examples, aspects of the operations of 1415 may be performed by a DRX manager as described with reference to FIGS. 5 through 8.

At 1420, the UE may transmit a report of the CLI signal strength measurement to the base station. The operations of 1420 may be performed according to the methods described herein. In some examples, aspects of the operations of 1420 may be performed by a CLI measurement report manager as described with reference to FIGS. 5 through 8. In some cases, the report of the CLI signal strength measurement may be transmitted together with a serving cell measurement report.

Figure 15:
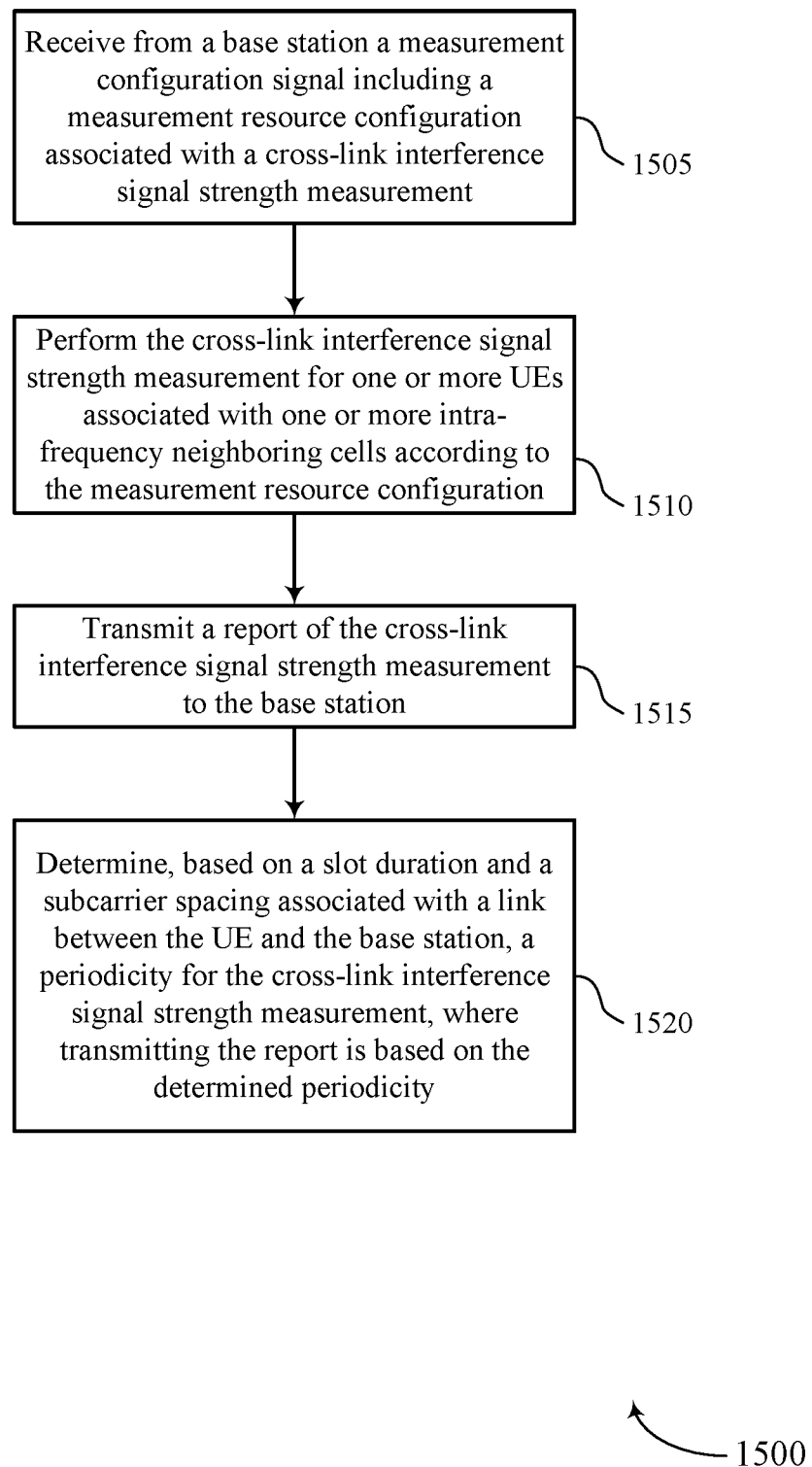

FIG. 15 shows a flowchart illustrating a method 1500 that supports UE measurement for CLI in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive from a base station a measurement configuration signal including a measurement resource configuration associated with a CLI signal strength measurement. The operations of 1505 may be performed according to the methods described herein. In some examples, aspects of the operations of 1505 may be performed by a CLI measurement configuration manager as described with reference to FIGS. 5 through 8.

At 1510, the UE may perform the CLI signal strength measurement for one or more UEs associated with one or more intra-frequency neighboring cells according to the measurement resource configuration. In some examples, the CLI signal strength measurement is performed during an intra-frequency measurement gap. The operations of 1510 may be performed according to the methods described herein. In some examples, aspects of the operations of 1510 may be performed by a CLI measurement performance manager as described with reference to FIGS. 5 through 8.

At 1515, the UE may transmit a report of the CLI signal strength measurement to the base station. The operations of 1515 may be performed according to the methods described herein. In some examples, aspects of the operations of 1515 may be performed by a CLI measurement report manager as described with reference to FIGS. 5 through 8.

At 1520, the UE may determine, based on a slot duration and a subcarrier spacing associated with a link between the UE and the base station, a periodicity for the CLI signal strength measurement, where transmitting the report is based on the determined periodicity. In some cases, the report of the CLI signal strength measurement may be transmitted together with a serving cell measurement report. The operations of 1520 may be performed according to the methods described herein. In some examples, aspects of the operations of 1520 may be performed by a periodicity manager as described with reference to FIGS. 5 through 8.

Figure 16:
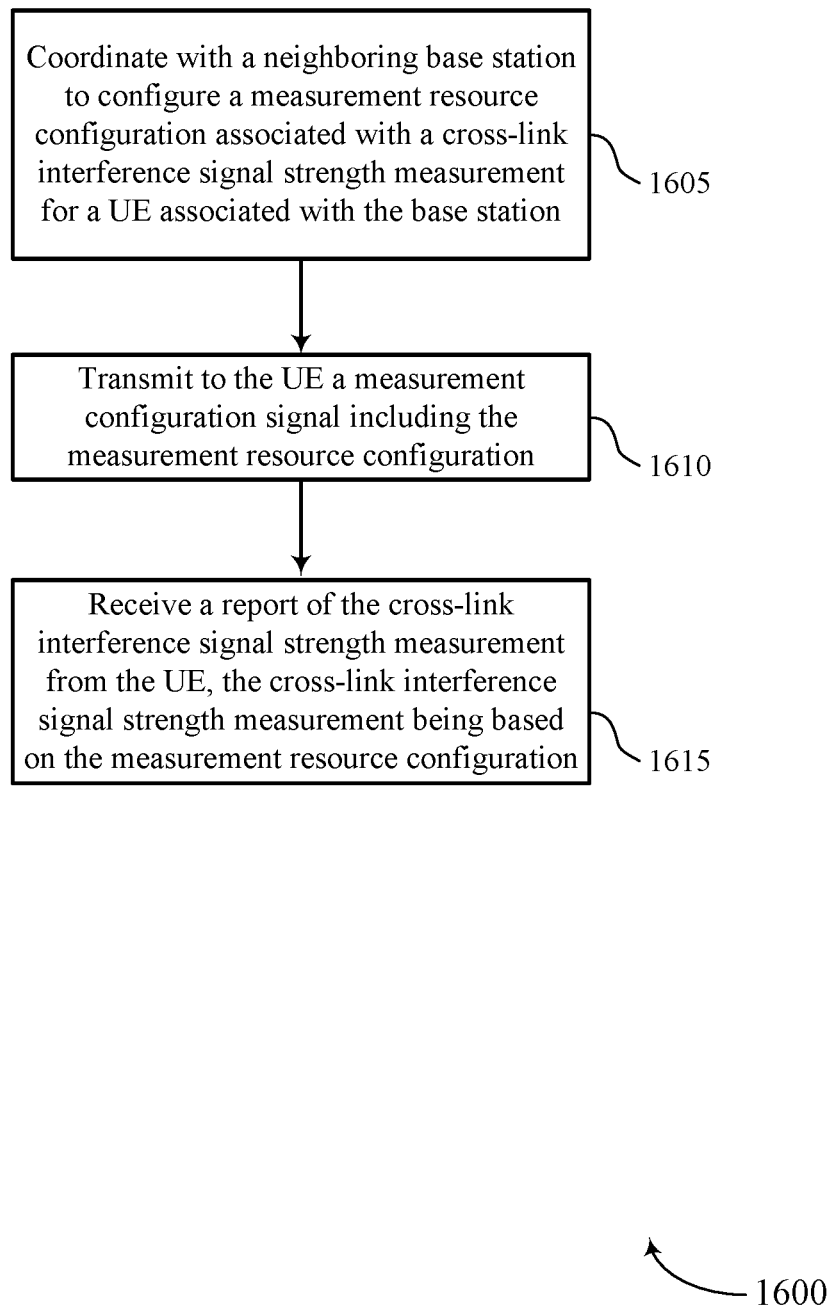

FIG. 16 shows a flowchart illustrating a method 1600 that supports UE measurement for CLI in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may coordinate with a neighboring base station to configure a measurement resource configuration associated with a CLI signal strength measurement for a UE associated with the base station. The operations of 1605 may be performed according to the methods described herein. In some examples, aspects of the operations of 1605 may be performed by a CLI measurement coordination manager as described with reference to FIGS. 9 through 12.

At 1610, the base station may transmit to the UE a measurement configuration signal including the measurement resource configuration. The operations of 1610 may be performed according to the methods described herein. In some examples, aspects of the operations of 1610 may be performed by a CLI measurement configuration manager as described with reference to FIGS. 9 through 12.

At 1615, the base station may receive a report of the CLI signal strength measurement from the UE, the CLI signal strength measurement being based on the measurement resource configuration. In some examples, the CLI signal strength measurement may be performed during an intra-frequency measurement gap. In some cases, the report of the CLI signal strength measurement may be received together with a serving cell measurement report. The operations of 1615 may be performed according to the methods described herein. In some examples, aspects of the operations of 1615 may be performed by a CLI measurement report manager as described with reference to FIGS. 9 through 12.

Figure 17:
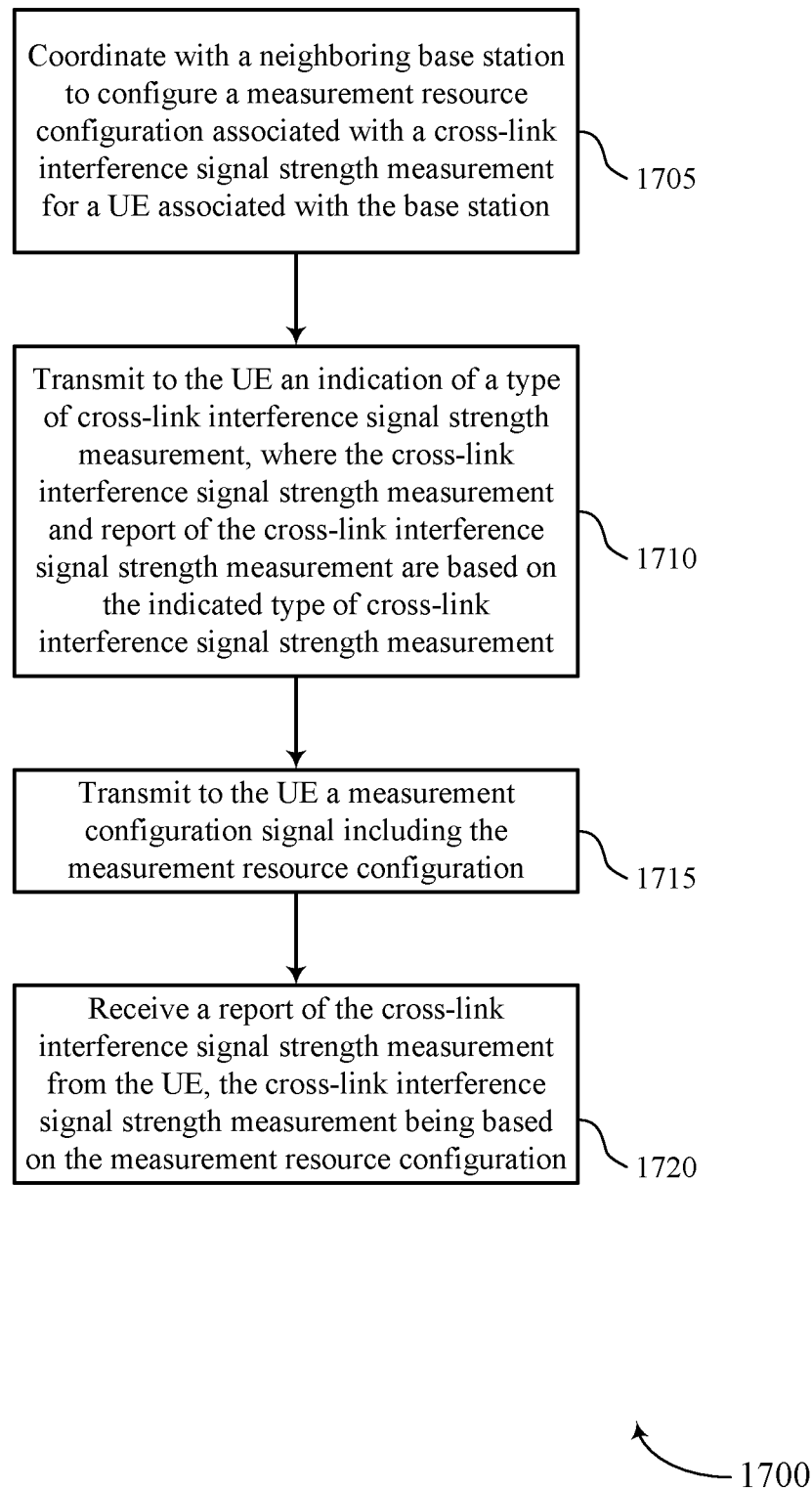

FIG. 17 shows a flowchart illustrating a method 1700 that supports UE measurement for CLI in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may coordinate with a neighboring base station to configure a measurement resource configuration associated with a CLI signal strength measurement for a UE associated with the base station. The operations of 1705 may be performed according to the methods described herein. In some examples, aspects of the operations of 1705 may be performed by a CLI measurement coordination manager as described with reference to FIGS. 9 through 12.

At 1710, the base station may transmit to the UE an indication of a type of CLI signal strength measurement, where the CLI signal strength measurement and report of the CLI signal strength measurement are based on the indicated type of CLI signal strength measurement. The operations of 1710 may be performed according to the methods described herein. In some examples, aspects of the operations of 1710 may be performed by a CLI measurement type manager as described with reference to FIGS. 9 through 12.

At 1715, the base station may transmit to the UE a measurement configuration signal including the measurement resource configuration. The operations of 1715 may be performed according to the methods described herein. In some examples, aspects of the operations of 1715 may be performed by a CLI measurement configuration manager as described with reference to FIGS. 9 through 12.

At 1720, the base station may receive a report of the CLI signal strength measurement from the UE, the CLI signal strength measurement being based on the measurement resource configuration. In some examples, the CLI signal strength measurement may be performed during an intra-frequency measurement gap. In some cases, the report of the CLI signal strength measurement may be received together with a serving cell measurement report. The operations of 1720 may be performed according to the methods described herein. In some examples, aspects of the operations of 1720 may be performed by a CLI measurement report manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc.

IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first user equipment (UE), comprising:
   receiving from a network device a measurement configuration signal comprising a measurement resource configuration associated with a cross-link interference signal strength measurement, wherein the measurement resource configuration indicates a number of slots associated with a periodicity for the cross-link interference signal strength measurement;
   performing the cross-link interference signal strength measurement for one or more UEs associated with one or more intra-frequency neighboring cells according to the measurement resource configuration;
   determining, based at least in part on the number of slots and a subcarrier spacing associated with a link between the UE and the network device, the periodicity for the cross-link interference signal strength measurement; and
   transmitting a report of the cross-link interference signal strength measurement to the network device, wherein the report is transmitted periodically based at least in part on the determined periodicity.

2. The method of claim 1, wherein the measurement resource configuration comprises one or more of a reporting configuration for the cross-link interference signal strength measurement, a filtering configuration for the cross-link interference signal strength measurement, a measurement gap configuration for the cross-link interference signal strength measurement, or a quantity configuration for the cross-link interference signal strength measurement.

3. The method of claim 2, wherein the cross-link interference signal strength measurement is performed during an intra-frequency measurement gap based at least in part on the measurement gap configuration.

4. The method of claim 1, further comprising:
   determining to perform the cross-link interference signal strength measurement during a discontinuous reception (DRX) off period based at least in part on a measurement accuracy threshold.

5. The method of claim 1, further comprising:
   detecting that a triggering condition for an event is fulfilled based at least in part on a comparison of the cross-link interference signal strength measurement to a threshold, wherein transmitting the report is further based at least in part on the event.

6. The method of claim 5, wherein the triggering condition comprises one or more of a first triggering condition associated with the cross-link interference signal strength measurement falling below a low threshold or a second triggering condition associated with the cross-link interference signal strength measurement exceeding a high threshold.

7. The method of claim 1, further comprising:
   receiving from the network device an indication of a type of cross-link interference signal strength measurement, wherein performing the cross-link interference signal strength measurement and reporting the cross-link interference signal strength measurement are based at least in part on the indicated type of cross-link interference signal strength measurement.

8. The method of claim 7, wherein the indication of the type of cross-link signal is received as one or more of: an explicit signal of the type of cross-link signal or an implicit indication of the type of cross-link signal.

9. The method of claim 7, wherein the indicated type of cross-link interference signal strength measurement comprises one or more of a cross-link interference received signal strength indicator (RSSI) measurement type or a sounding reference signal received signal received power (RSRP) measurement type.

10. The method of claim 9, wherein the measurement configuration signal comprises a first measurement configuration associated with the cross-link interference RSSI measurement type and a second measurement configuration associated with the sounding reference signal RSRP measurement type.

11. The method of claim 1, wherein the report of the cross-link interference signal strength measurement comprises an indication that a cross-link signal for the one or more UEs is too strong to measure or a cross-link interference signal strength measurement value associated with the cross-link signal being too strong to measure.

12. The method of claim 1, wherein the report of the cross-link interference signal strength measurement is transmitted together with a serving cell measurement report.

13. The method of claim 1, wherein the measurement resource configuration indicating the subcarrier spacing associated with a cross-link interference signal strength measurement.

14. A user equipment (UE) for wireless communication, comprising:
   one or more memories storing processor-executable code; and
   one or more processors coupled with the one or more memories and individually or collectively operable to execute the code to cause the UE to:
   receive from a network device a measurement configuration signal comprising a measurement resource configuration associated with a cross-link interference signal strength measurement, wherein the measurement resource configuration indicates a number of slots associated with a periodicity for the cross-link interference signal strength measurement;

perform the cross-link interference signal strength measurement for one or more UEs associated with one or more intra-frequency neighboring cells according to the measurement resource configuration;

determine, based at least in part on the number of slots and a subcarrier spacing associated with a link between the UE and the network device, the periodicity for the cross-link interference signal strength measurement; and transmit a report of the cross-link interference signal strength measurement to the network device, wherein the report is transmitted periodically based at least in part on the determined periodicity.

15. The UE of claim 14, wherein the measurement resource configuration comprises one or more of a reporting configuration for the cross-link interference signal strength measurement, a filtering configuration for the cross-link interference signal strength measurement, a measurement gap configuration for the cross-link interference signal strength measurement, or a quantity configuration for the cross-link interference signal strength measurement.

16. UE of claim 14, wherein the one or more processors are individually or collectively further operable to execute the code to cause the UE to:

determine to perform the cross-link interference signal strength measurement during a discontinuous reception (DRX) off period based at least in part on a measurement accuracy threshold.

17. The UE of claim 14, wherein the one or more processors are individually or collectively further operable to execute the code to cause the UE to:

detect that a triggering condition for an event is fulfilled based at least in part on a comparison of the cross-link interference signal strength measurement to a threshold, wherein transmitting the report is further based at least in part on the event.

18. The UE of claim 17, wherein the triggering condition comprises one or more of: a first triggering condition associated with the cross-link interference signal strength measurement falling below a low threshold or a second triggering condition associated with the cross-link interference signal strength measurement exceeding a high threshold.

19. The UE of claim 14, wherein the one or more processors are individually or collectively further operable to execute the code to cause the UE to:

receive from the network device an indication of a type of cross-link interference signal strength measurement, wherein performing the cross-link interference signal strength measurement and reporting the cross-link interference signal strength measurement are based at least in part on the indicated type of cross-link interference signal strength measurement.

20. The UE of claim 19, wherein the indication of the type of cross-link signal is received as one or more of: an explicit signal of the type of cross-link signal or an implicit indication of the type of cross-link signal.

21. The UE of claim 19, wherein the indicated type of cross-link interference signal strength measurement comprises one or more of a cross-link interference received signal strength indicator (RSSI) measurement type or a sounding reference signal received signal received power (RSRP) measurement type.

22. The UE of claim 21, wherein the measurement configuration signal comprises a first measurement configuration associated with the cross-link interference RSSI measurement type and a second measurement configuration associated with the sounding reference signal RSRP measurement type.

23. The UE of claim 14, wherein the report of the cross-link interference signal strength measurement comprises an indication that a cross-link signal for the one or more UEs is too strong to measure or a cross-link interference signal strength measurement value associated with the cross-link signal being too strong to measure.

24. The UE of claim 14, wherein the report of the cross-link interference signal strength measurement is transmitted together with a serving cell measurement report.

* * * * *